United States Patent
Brehmer et al.

(10) Patent No.: US 12,353,675 B1
(45) Date of Patent: Jul. 8, 2025

(54) DATA ANALYSIS PLATFORM WITH ANIMATION FOR RENDERING GRAPHICAL REPRESENTATIONS OF DATA

(71) Applicant: Tableau Software, LLC, Seattle, WA (US)

(72) Inventors: Matthew Michael Brehmer, Seattle, WA (US); Rodion Degtyar, Sammamish, WA (US); Harveen Kathuria Kaza, Sammamish, WA (US); Bryan Alexander Feddern, Seattle, WA (US); Lauren Lea Jackson, Vancouver (CA); Vladimir Kondrashov, Woodinville, WA (US)

(73) Assignee: Tableau Software, LLC, Seattle, WA (US)

( * ) Notice: Subject to any disclaimer, the term of this patent is extended or adjusted under 35 U.S.C. 154(b) by 128 days.

(21) Appl. No.: 17/588,200

(22) Filed: Jan. 28, 2022

(51) Int. Cl.
*G06F 3/04817* (2022.01)
*G06F 3/0486* (2013.01)
*G06T 11/20* (2006.01)
*G06T 13/80* (2011.01)

(52) U.S. Cl.
CPC ........ *G06F 3/04817* (2013.01); *G06F 3/0486* (2013.01); *G06T 11/206* (2013.01); *G06T 13/80* (2013.01); *G06F 2203/04803* (2013.01)

(58) Field of Classification Search
CPC .............. G06F 3/04817; G06F 3/0486; G06F 2203/04803; G06T 11/206; G06T 13/80
See application file for complete search history.

(56) References Cited

U.S. PATENT DOCUMENTS

| | | | | |
|---|---|---|---|---|
| 6,639,614 | B1 * | 10/2003 | Kosslyn ................ | G06T 11/206 715/837 |
| 8,620,635 | B2 * | 12/2013 | Rubin ..................... | G06F 30/00 703/2 |
| 10,832,456 | B1 * | 11/2020 | Levy ........................ | G06F 3/011 |
| 2003/0197702 | A1 * | 10/2003 | Turner .................... | G06T 13/00 345/473 |
| 2004/0117393 | A1 * | 6/2004 | DeMesa ................. | G06Q 30/02 |
| 2005/0257204 | A1 * | 11/2005 | Bryant .................... | G06F 9/451 345/473 |

(Continued)

*Primary Examiner* — Irete F Ehichioya
*Assistant Examiner* — Phoebe X Pan
(74) *Attorney, Agent, or Firm* — Morgan, Lewis & Bockius LLP

(57) ABSTRACT

A computer system animates data visualizations. The system displays a graphical user interface, including a schema region with data field icons representing data fields from a data source and a canvas region displaying a data visualization having visual marks representing data according to visual properties. A user associates a data field icon, representing a data field, with a visual property of the visual marks. In response, the system modifies the data visualization so that the visual property of each visual mark is displayed according to data values of the data field. A user associates a second data field icon, representing a second data field, with a second visual property of the visual marks. The second visual property specifies a nonstop animation format. In response, the system modifies the data visualization to animate the visual marks according to the second visual property and data values for the second data field.

18 Claims, 32 Drawing Sheets

(56) References Cited

U.S. PATENT DOCUMENTS

| | | | |
|---|---|---|---|
| 2010/0039434 A1* | 2/2010 | Makkinejad | G06T 13/80 345/473 |
| 2010/0194778 A1* | 8/2010 | Robertson | G06T 11/206 345/473 |
| 2012/0148088 A1* | 6/2012 | Mital | G06T 11/206 382/100 |
| 2014/0047312 A1* | 2/2014 | Ruble | G06F 16/29 715/212 |
| 2016/0070430 A1* | 3/2016 | Kim | G06F 3/04817 715/769 |
| 2017/0046016 A1* | 2/2017 | Riche | G06T 13/80 |
| 2020/0126309 A1* | 4/2020 | Moroze | G06F 16/54 |
| 2020/0233559 A1* | 7/2020 | Rueter | G06F 16/26 |

\* cited by examiner

Figure 3N

DATA ANALYSIS PLATFORM WITH ANIMATION FOR RENDERING GRAPHICAL REPRESENTATIONS OF DATA

TECHNICAL FIELD

The disclosed implementations relate generally to data visualization and more specifically to systems, methods, and user interfaces that animate data visualizations according to data values of user-selected data fields.

BACKGROUND

Data visualization applications enable a user to understand a data set visually, including distribution, trends, outliers, and other factors that are important to making business decisions. Some data sets are very large or complex and include many data fields. Analytical workflows for analyzing large data sets typically involve exploring data iteratively by incrementally refining data views, thereby discovering various trends and patterns within the data. Various visual analysis tools exist that can be used to help users express and execute analytical workflows for visually exploring and analyzing data.

Despite the existence of such tools, creating expressive data visualizations still remains a challenging task. For example, users typically must have sufficient knowledge in data visualization and/or statistics. Most of the tools are difficult to use by non-experts. Some of these tools are more expressive and allow users to programmatically create charts (e.g., declarative grammars allow developers to specify target visualizations using libraries and APIs). Other tools are easier to learn and more efficient to use for creating simple charts (e.g., chart pickers), but provide limited support for expressiveness or require tedious workarounds for building more complex visualization (e.g., the desired charts and/or analytical workflows may conflict with the system defaults).

SUMMARY

Some implementations provide a user with options for modifying a data visualization, including binding different data fields to different properties of visual marks that are displayed in the data visualization. This enables a user to control various aspects of the data visualization, and provides a way for a user to generate data visualizations that represent a plurality of data fields. In addition, the user can specify animations for the visual marks in the data visualization according to selected data fields. Some implementations provide a user interface that allows a user to easily interact with data field icons in order to control how data fields are associated with the various visual properties of the visual marks.

In accordance with some implementations, a method executes at an electronic device with a display. For example, the electronic device can be a smart phone, a tablet, a notebook computer, or a desktop computer. The computer system has one or more processors, a display, and memory storing one or more programs configured for execution by the one or more processors. The device displays a graphical user interface on the display, including (a) a schema region displaying a plurality of data field icons. Each data field icon represents a respective data field from a user-selected data source. The graphical user interface also includes (b) a canvas region displaying a data visualization having a plurality of visual marks. Each visual mark represents data from the data source according to visual properties assigned to user-selected data fields, including assignment of a first data field to a first visual property.

A user provides a first user input to associate a second data field icon of the plurality of data field icons, representing a second data field, to a second visual property of the visual marks. In response to the first user input, the device binds the second data field to the second visual property, and modifies the data visualization so that the second visual property of each visual mark is displayed in accordance with data values of the second data field.

A user provides a second user input to associate a third data field icon, representing a third data field, to a third visual property of the visual marks. The third visual property specifies a nonstop animation format. In response to the second user input, the device binds the third data field to the third visual property and modifies the data visualization to animate the visual marks according to the third visual property and data values for the third data field.

In some implementations, the method includes, prior to displaying the data visualization, receiving user input to select a first data field icon representing a first data field, from the schema region, and to place the first data field icon onto the canvas region.

In some implementations, the canvas region includes a plurality of user interface affordances to designate (i) a layout type that specifies a row-based arrangement, a column-based arrangement, or an inline arrangement, (ii) a mark type that specifies a shape for visual data marks, (iii) one or more visual encodings that specify color, size, text, x-axis, y-axis, ascending sort, descending sort, or level of detail for the visual marks, according to data values for a respective data field represented by a respective data field icon, and (iv) other visual properties that define the visual marks.

In some implementations, the first user input comprises selecting the second data field icon from the schema region and moving the second data field icon to a portion in the canvas region that specifies a plurality of visual properties.

In some implementations, the user input comprises a drag and drop operation.

In some implementations, the visual properties include: shape properties, fill properties, stroke properties, orientation properties, and size properties.

In some implementations, the nonstop animation format is applied to a fill property, and animating the visual marks comprises a repeated fill animation.

In some implementations, the nonstop animation format is applied to composite marks, and animating the visual marks comprises animating a respective component of each visual mark.

In some implementations, the nonstop animation format specifies a speed of the animation and an orientation for the animation.

In some implementations, each visual mark consists of a respective single component, and the first, second, and third visual properties all apply to the respective single component of each visual mark.

In some implementations, each visual mark comprises two or more distinct components, the first visual property applies to a respective first component of each visual mark, and the third visual property applies to a respective second component, distinct from the first component, of each visual mark. In some implementations, the first component is static and the second component is continuously animated. In some implementations, the second visual property applies to the first component of each visual mark.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to animate the visual marks in data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

One tool for visual analysis is provided by Tableau Software, which provides a high-level formalism called VizQL™ for specifying components of data visualization. VizQL supports the expression of chart creation through user interaction or direct manipulation, where visibility of the object of interest is translated automatically into a complex language syntax. For example, users may build charts by associating data fields from a data source to visual attributes of a data visualization by interacting (e.g., via a drag-and-drop operation) with representations of the data fields in a user interface. The representations are sometimes referred to as data field icons.

The present application Tableau's earlier work, providing a variety of additional visual properties of data visualizations, including animated visual properties that control how a data visualization is animated over time. For example, the visual marks in a data visualization are enabled to move and/rotate, and, other visual properties of the visual marks can also be animated. The animation (e.g., the speed of the animation) is based on data values of a data field assigned to the animation. For example, a user can animate a fill pattern of a visual mark, and the animation is controlled by data values of a data field that is bound to the fill pattern.

Figure 1:
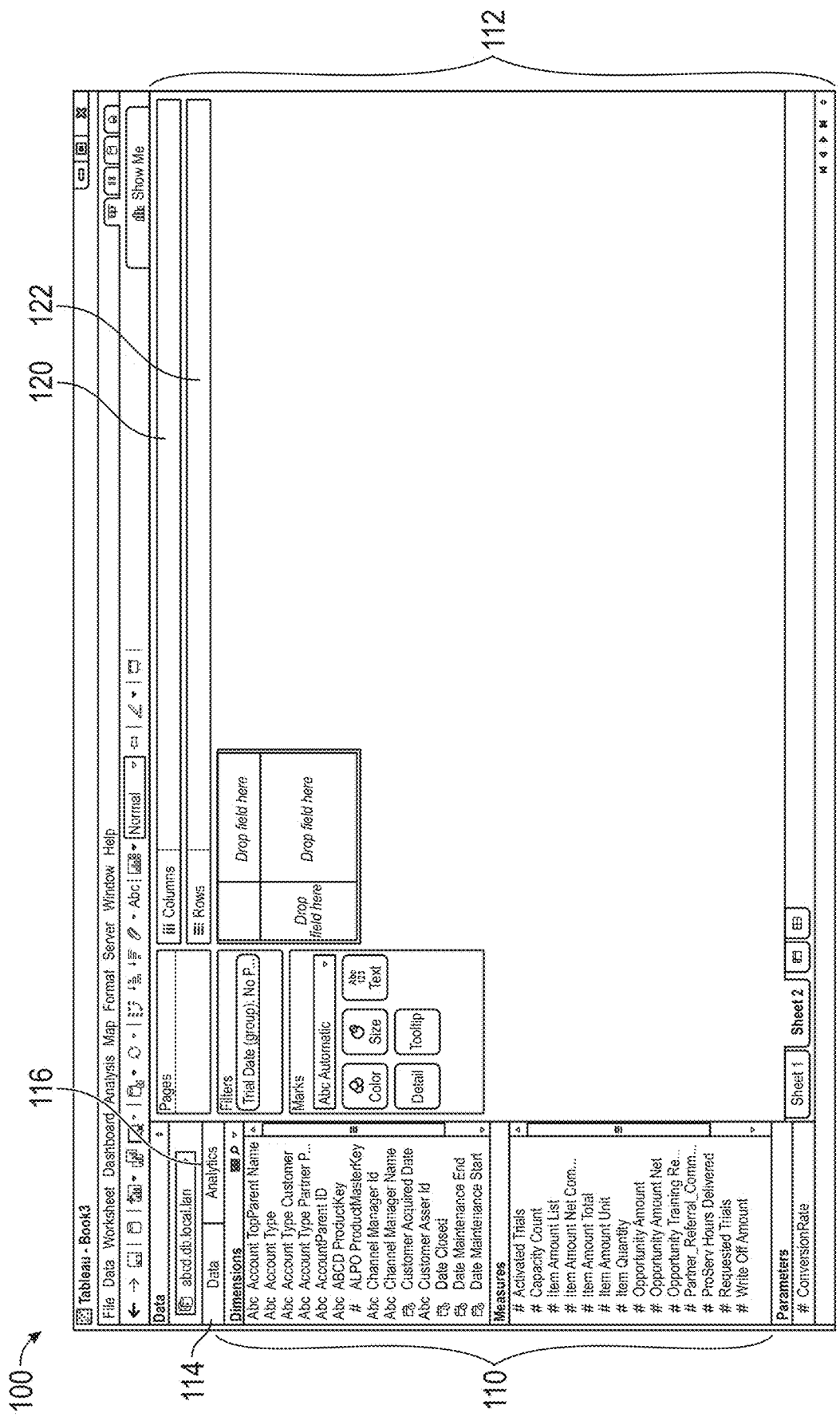
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
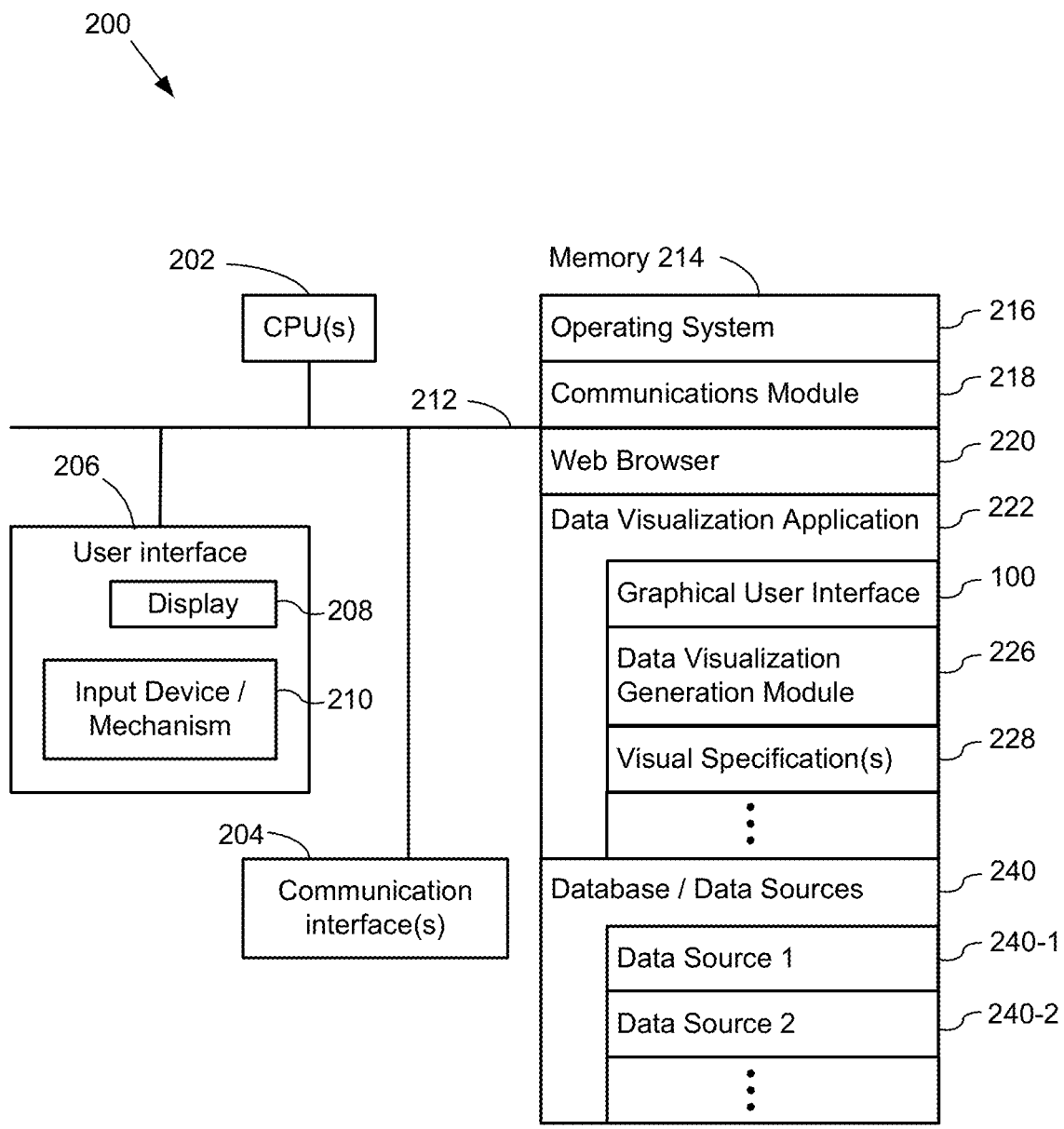
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/ cores (CPUs) 202 for executing modules, programs, and/or instructions stored in the memory 214 and thereby performing processing operations: one or more network or other communications interfaces 204: memory 214; and one or more communication buses 212 for interconnecting these components. In some implementations, the communication buses 212 include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

User Interfaces and Associated Processes

Figure 3A:
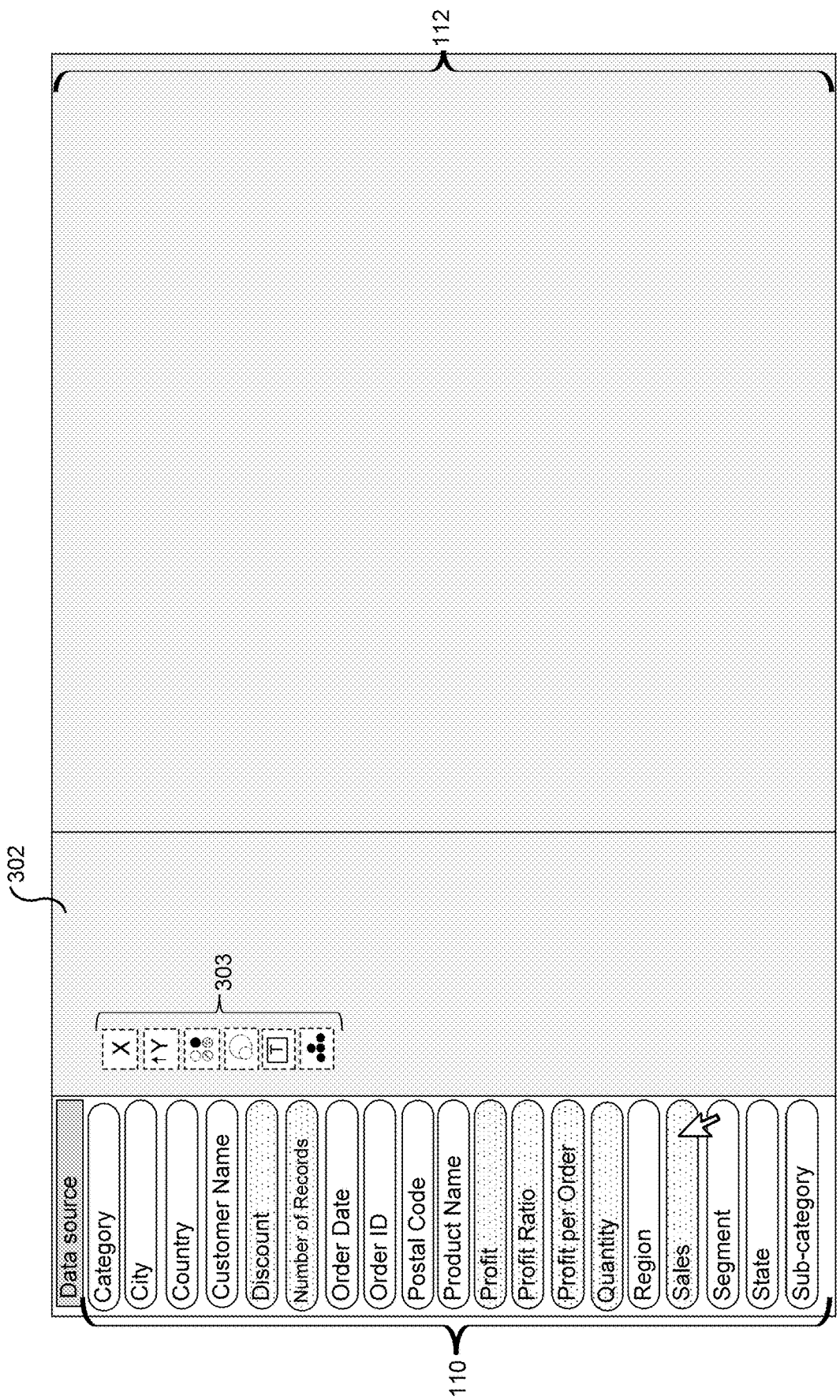
FIGS. 3A-3N illustrate data visualizations that are updated in accordance with user interaction with data field icons according to some implementations.

FIG. 3A provides a block diagram of a graphical user interface for interactive data analysis. The graphical user interface includes a schema region 110 (e.g., as described above with reference to FIG. 1), a canvas region 302, and a data visualization region 112 (e.g., as described above with reference to FIG. 1). In some implementations, the canvas region 302 includes a plurality of user interface affordances 303 to designate a layout type that specifies a row-based arrangement, a column-based arrangement, or an inline arrangement, a mark type that specifies a shape for visual data marks, one or more visual encodings that specify color, size, text, x-axis, y-axis, ascending sort, descending sort, or level of detail for a data visualization, according to data values for a data field represented by a data field icon, and other visual properties that define the plurality of visual marks.

FIG. 3A illustrates a plurality of data field icons included in the schema region 110. Each data field icon represents (e.g., corresponds to) a data field retrieved from a data source. In some implementations, a user can select a data field icon from the schema region 110 and place it in the canvas region 302 (e.g., using a drag and drop operation). For example, the user selects (e.g., via a user input 304 shown in FIG. 3B) a data field icon for a data field (e.g., "Sales"), and the computing device generates a data visualization based on the selected data field(s), as described with reference to FIG. 3E.

Figure 3B:
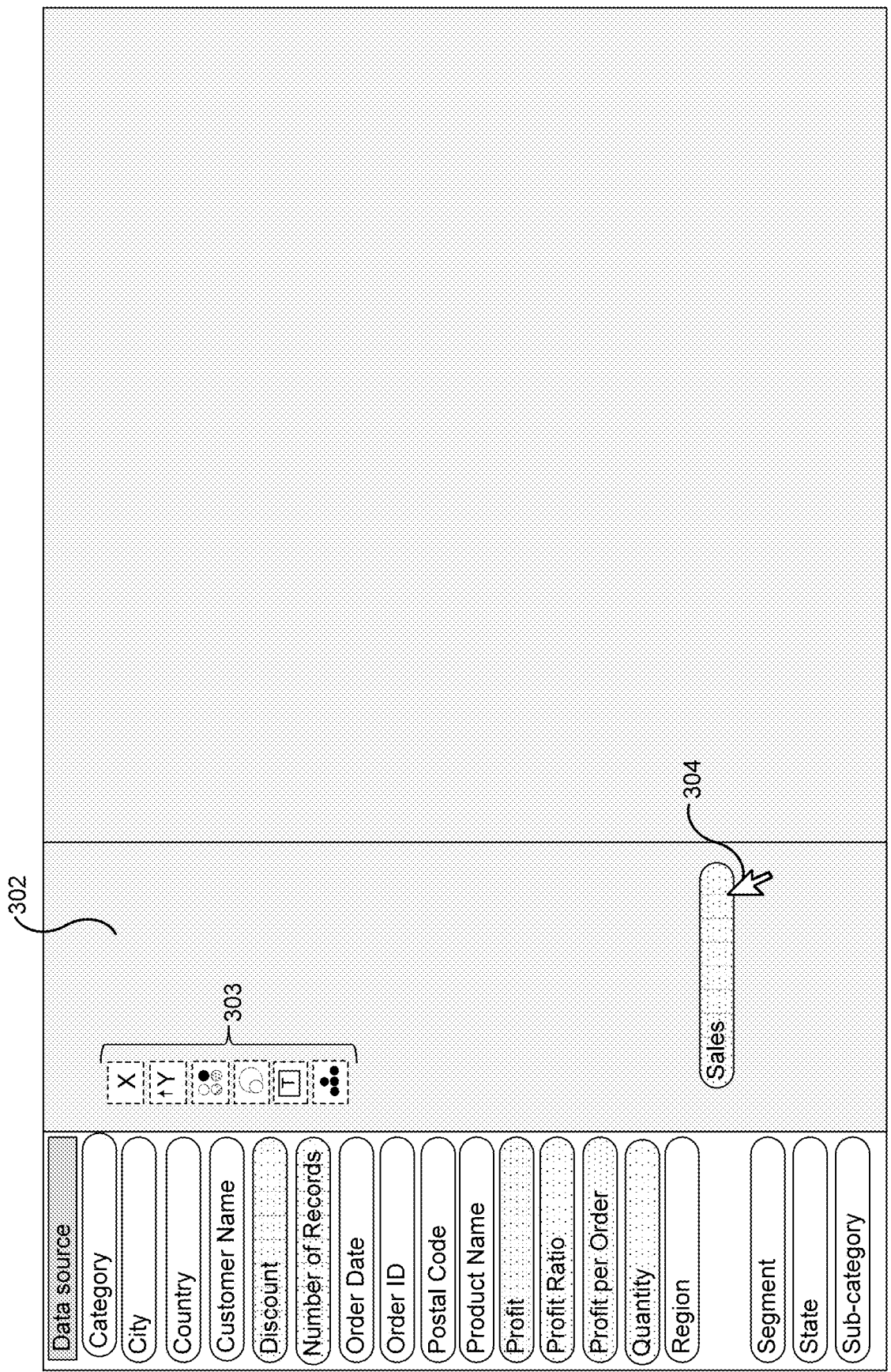
Figure 3C:
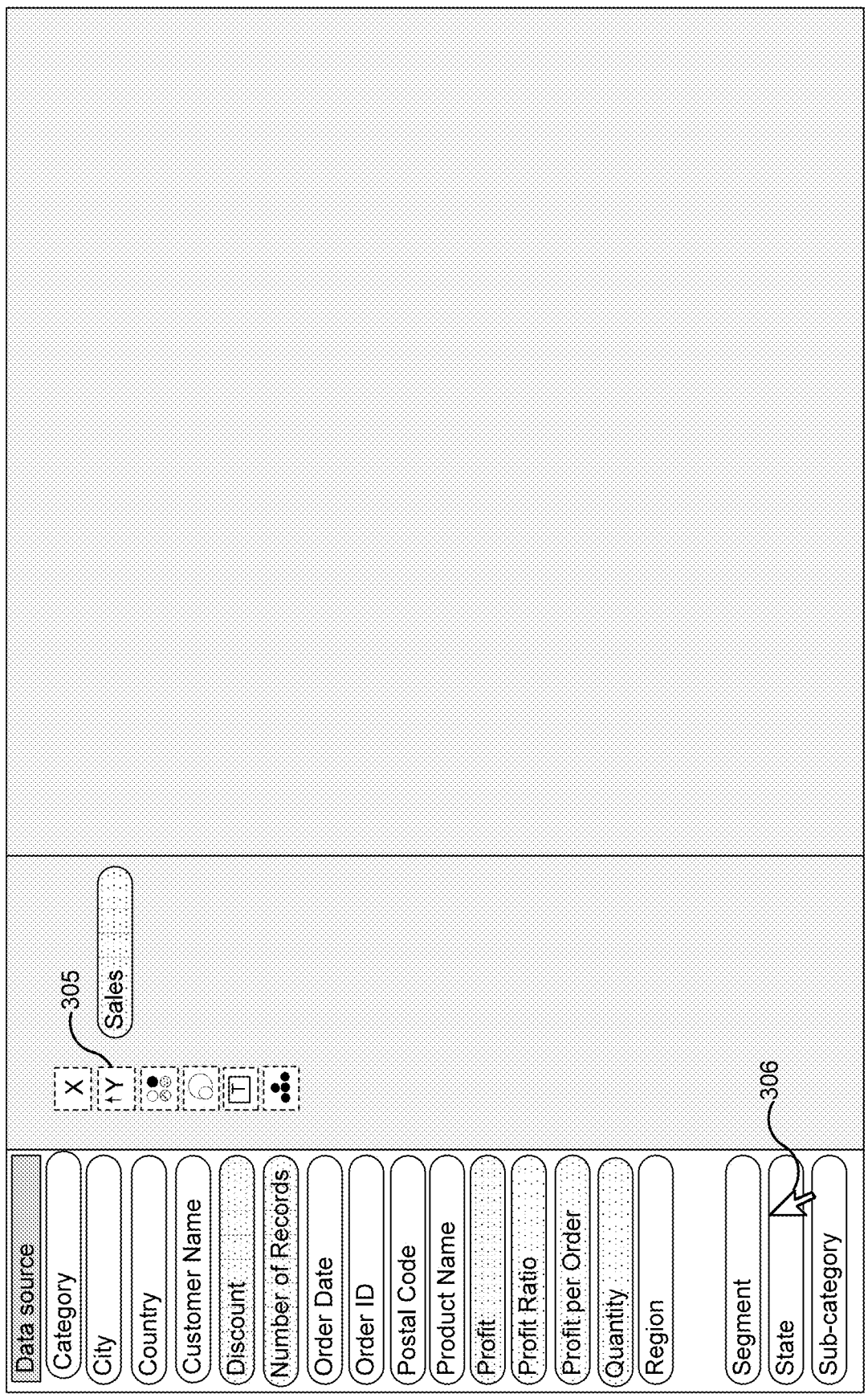
Figure 3D:
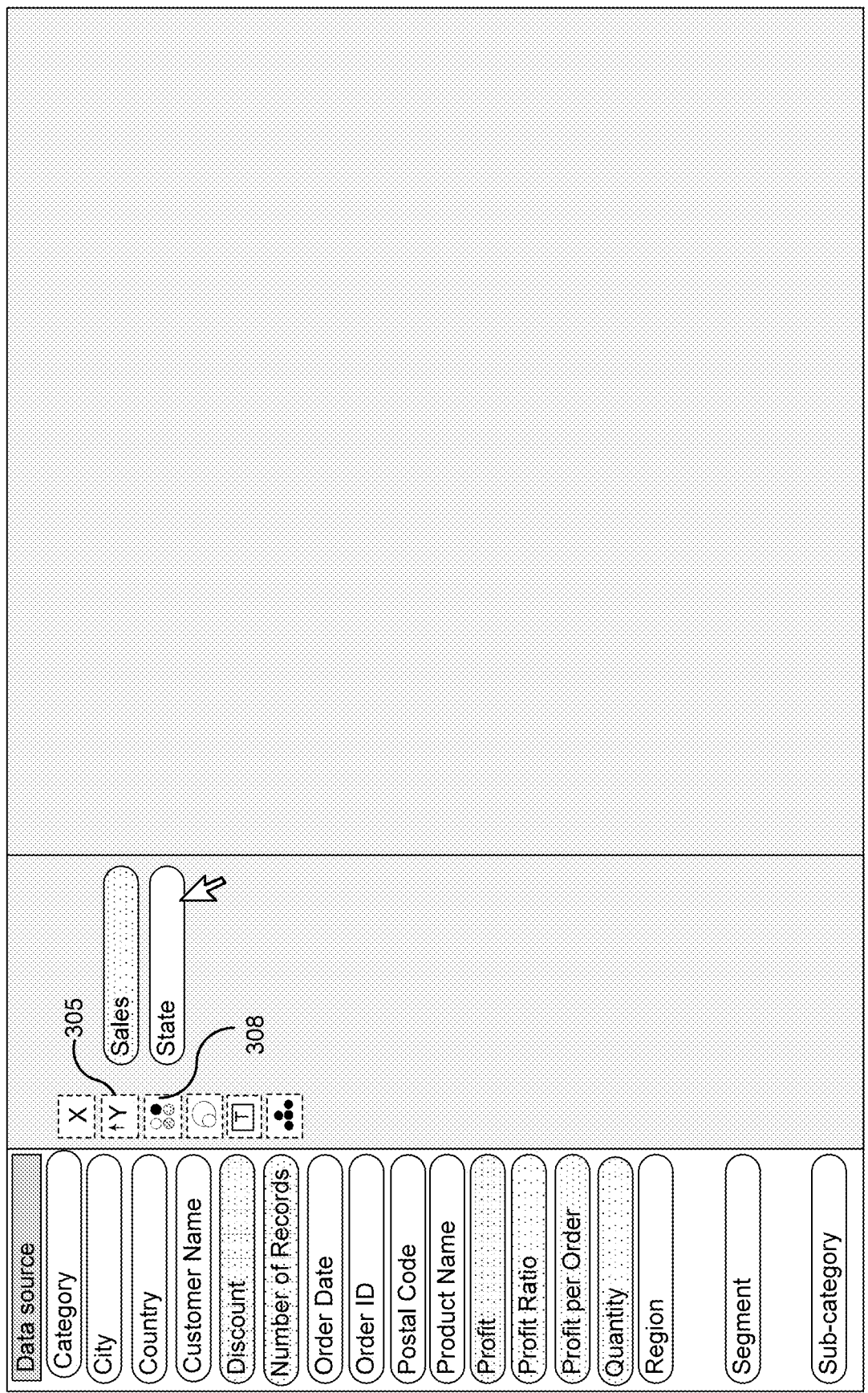
Figure 3E:
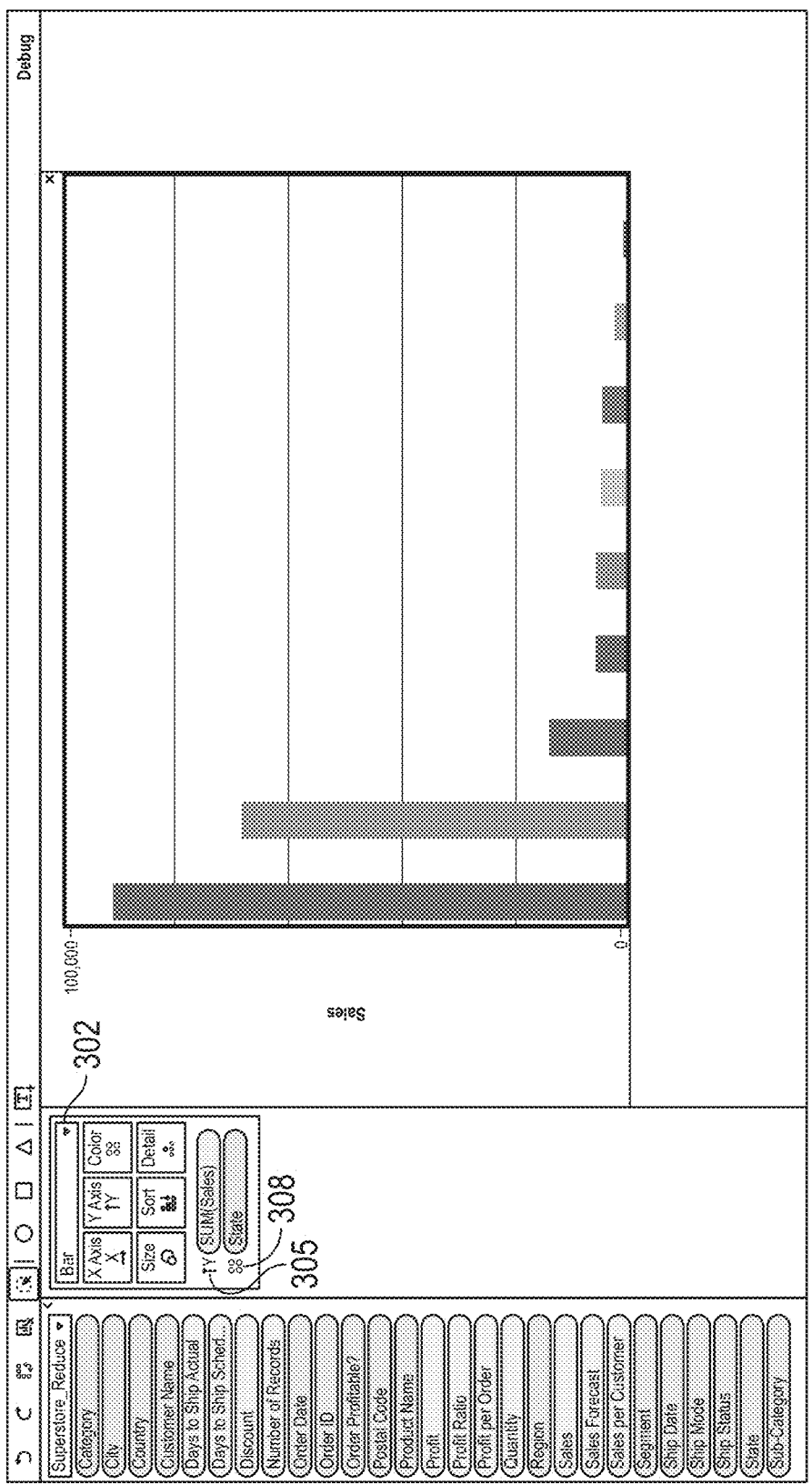

FIGS. 3B-3C illustrates a user input 304 dragging the Sales data field icon onto the canvas region 302. For example, the user is performing a drag and drop operation on the Sales data field icon. In some implementations, in response to the user dropping the Sales data field icon onto the canvas region 302, the data field corresponding to "Sales" is tied to the y-axis, as indicated by icon 305 (e.g., for a generated data visualization, as shown in FIG. 3E). For example, icon 305 represents the y-axis visual encoding (e.g., data values for "Sales" are displayed along the y-axis in the generated data visualization).

In some implementations, as illustrated in FIG. 3C, the user can select another data field icon 306 (e.g., "State") from the schema region 110. For example, the user performs a second drag and drop operation to place the "State" data field icon onto the canvas region 302. The "State" data field icon specifies that different colors will be assigned to each data value for State (e.g., as indicated by the color encoding icon 308). Accordingly, the generated data visualization includes the amount of Sales (e.g., represented along the y-axis), aggregated by State (e.g., each bar represents a different State and is displayed with a different color). In some implementations, the electronic device automatically, without user input, performs an aggregation of the data field Sales (e.g., a Sum of the data values of "Sales"). For example, numeric fields by default are used as measures, whereas non-numeric fields (e.g., text fields and date fields, such as State) by default are used as dimensions.

A dimension is a data field that organizes data into categories (also referred to as "buckets"). For example, if a data source includes data associated with the "United States" and the data source includes a data field corresponding to "State," the "State" is used as a dimension. Each dimension creates distinct divisions within a data visualization, such as separate bars in a bar chart (e.g., a separate bar for each state). These divisions are typically labeled with dimension headers, with one header for each corresponding dimension value (e.g., each bar may be labeled with the name of the corresponding state).

A measure is a data field that is used to measure something, such as sales amount, profit, or order quantity, and is typically continuous. For example, whereas the dimension 'State' has a fixed set of discrete possible values, a 'Sales Amount' data field can have any value within a large range. A significant number of records could include a variety of small sales amounts correlating to lower-priced items and many other records may include larger amounts of sales for higher-priced items. Each measure is typically aggregated to a single value (e.g., by default measures are summed) at a level of detail (grouping) according to the selected dimensions (e.g., sales may be aggregated by state). For example, the numeric data field, Sales, is aggregated in the data visualization illustrated in FIGS. 3E-3N.

As illustrated in FIG. 3E, in some implementations, the electronic device generates and displays the data visualization based on the selected data field icons, for example, a bar chart that illustrates SUM (Sales) on the y-axis, aggregated by State, where each state is displayed with a different color (e.g., each state's sales is represented by a bar in the bar chart). In some implementations, the user can sort the visual marks (e.g., in FIG. 3E, the marks are sorted by greatest value of "Sum of Sales" to least). Different sorting options are provided within the canvas region 302 for the user to select.

Figure 3F:
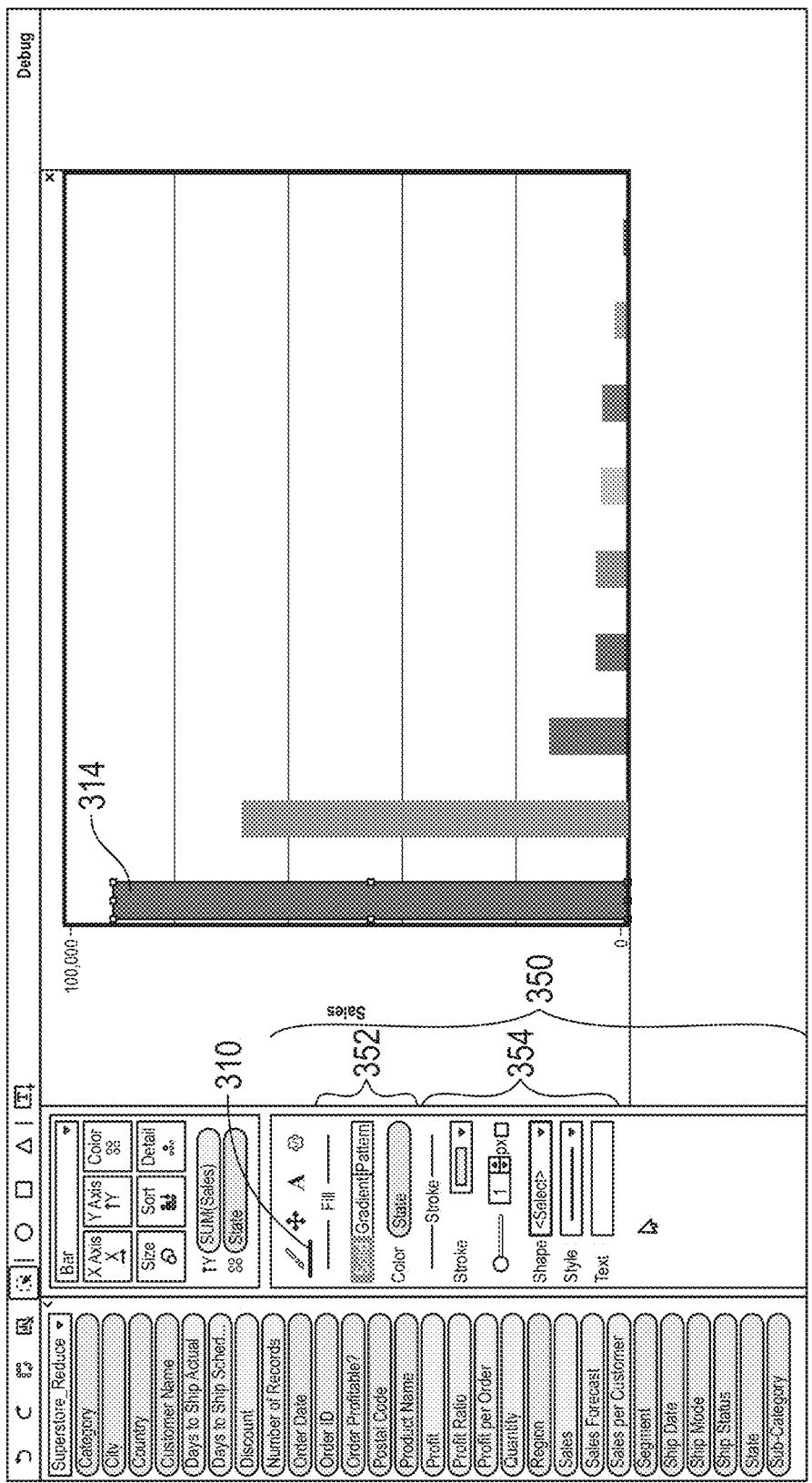

FIG. 3F illustrates additional control options provided in the canvas region 302. In response to the user selecting a visual mark 314 in the data visualization, a set of visual properties 350 is displayed, grouped into four tabs. Initially, the drawing tab 310 is selected. When the drawing tab 310 is selected, the visual properties 350 include a group of fill options 352 and a group of stroke options 354. The fill options include a solid fill, a gradient fill, and a pattern fill. Further, the user can specify a particular data field to determine fill color. In FIG. 3F, the data field "State" is bound to the fill color, so each State is represented by a different color.

The stroke options 354 include stroke color and stroke width to be applied to the visual marks. In some implementations, when the user changes the stroke color and/or the stroke width, the properties of the visual marks are updated in real-time. FIG. 3F further illustrates options to change shape, style, and text of the visual marks in the data visualization.

Figure 3G:
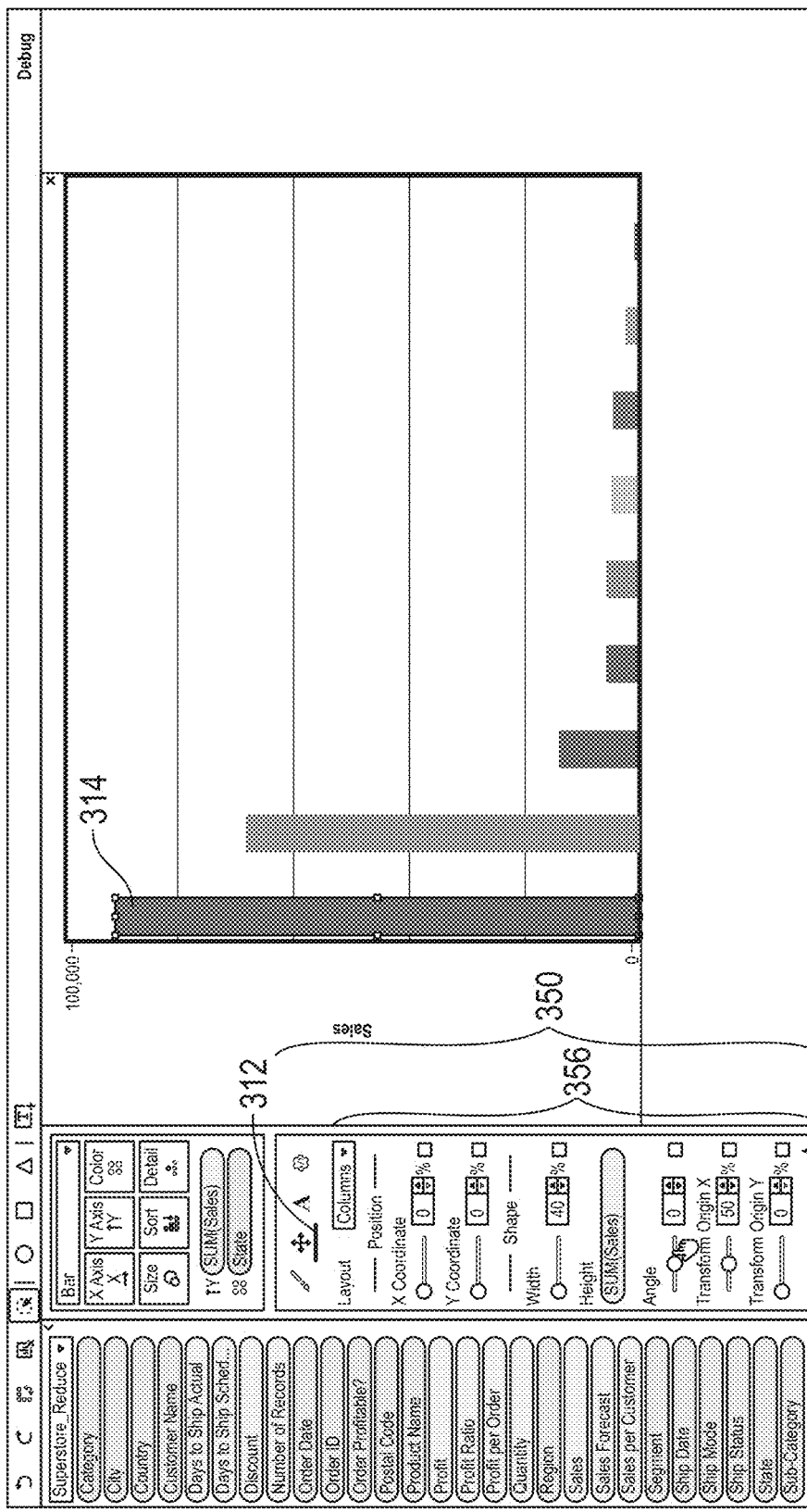

In FIG. 3G, the layout tab 312 is selected. When the layout tab 312 is selected, the visual properties 350 include layout properties 356, including relative position (e.g., alignment) of the visual marks (x-coordinate and y-coordinate), width of the visual marks, height of the visual marks (e.g., which is bound to SUM (Sales) in FIG. 3G), the angle of the visual marks, and options to transform the X and Y origin.

On the right of these visual properties are animation check boxes 358, which animate the specific visual property when selected.

Figure 3H:
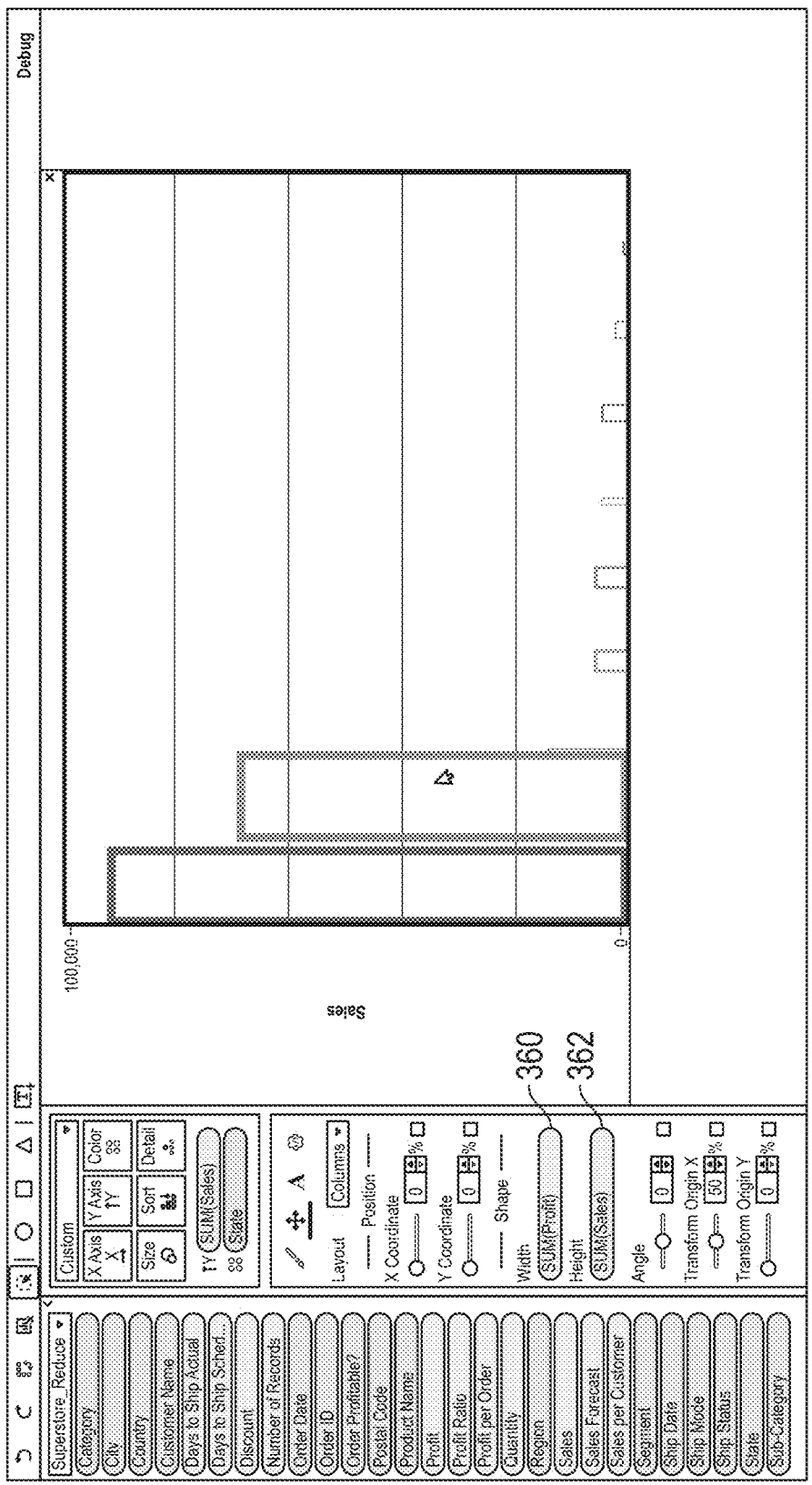

FIG. 3H illustrates the user binding a data field to the width visual property. In addition to the height (e.g., along the y-axis) of the visual marks being bound to SUM (Sales) 362, the width of the visual marks is bound to SUM (Profit) 360. "Profit" was selected from the plurality of data field icons displayed in the schema region. FIG. 3H illustrates the updated data visualization, with the visual marks displayed with varying widths based on the aggregated (e.g., sum of) Profits for each State. Accordingly, two or more distinct visual properties (e.g., width of the visual marks, and height of the visual marks in this example) are bound to distinct data fields.

Figure 3I:
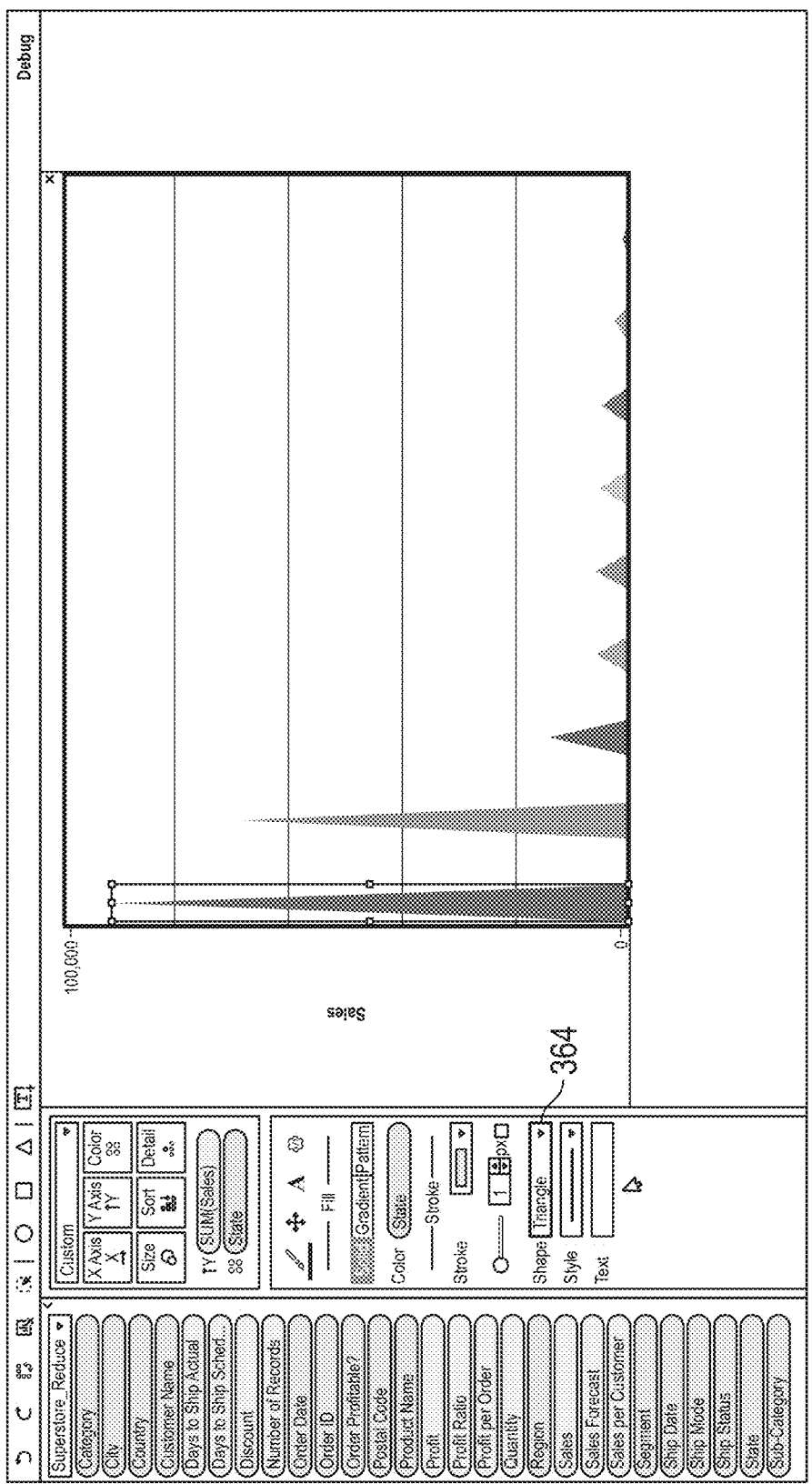

FIG. 3I illustrates the user changing another visual property of the visual marks. The shape of the visual marks has been assigned to "Triangle" 364. In some implementations, the user selects the shape from a dropdown menu (e.g., including rectangle, triangle, square, or circle).

Figure 3J:
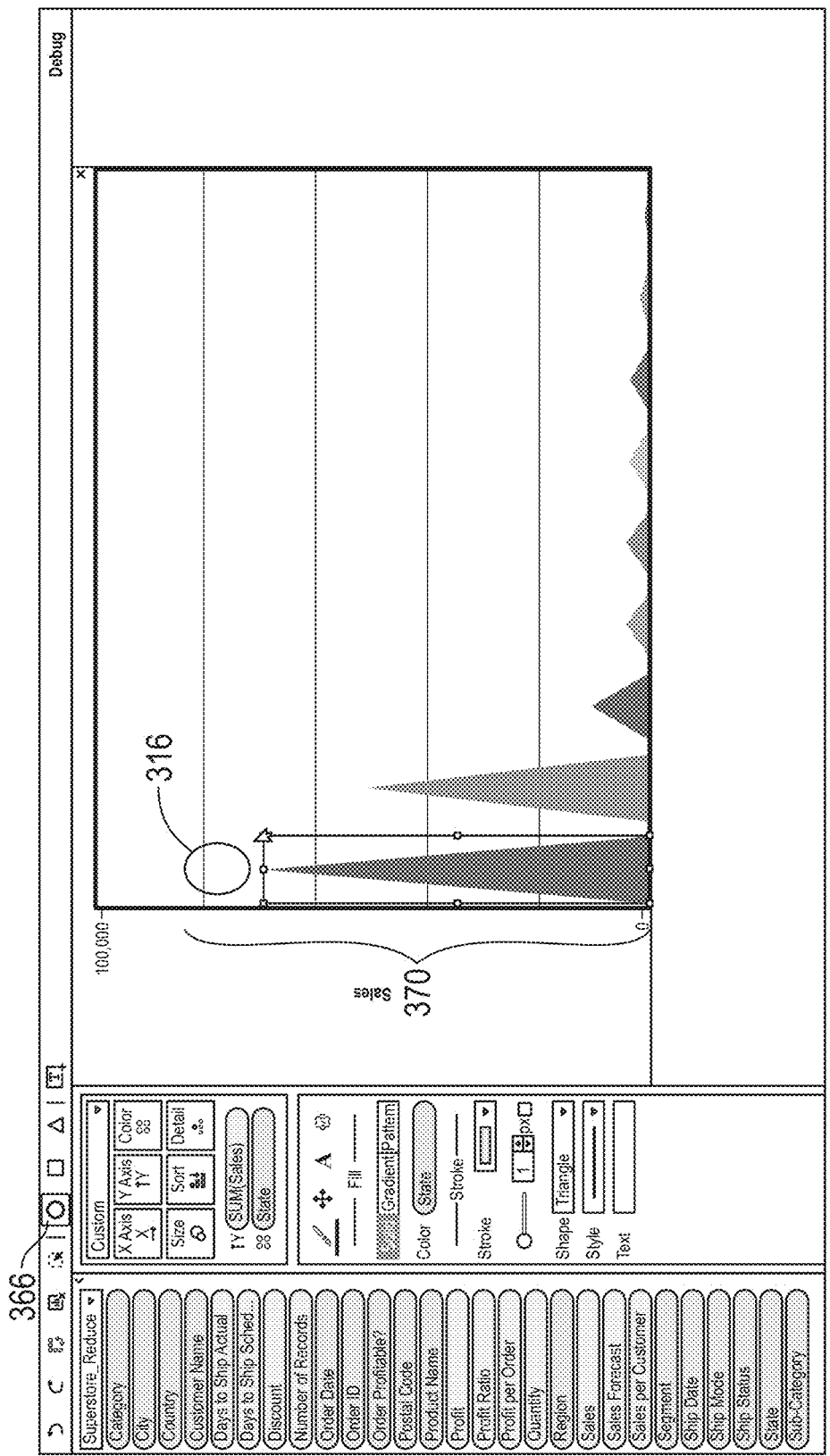
Figure 3K:
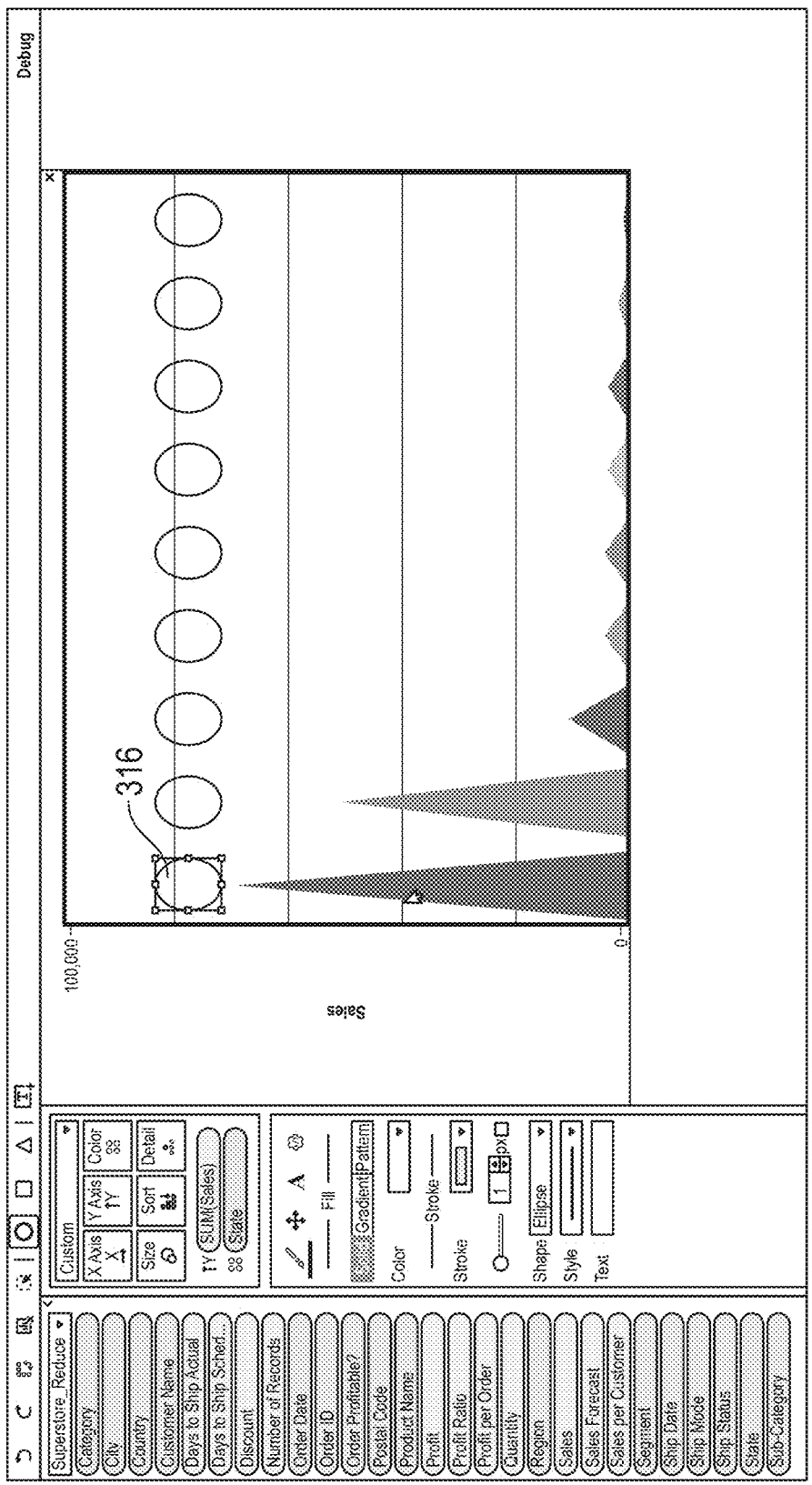

FIG. 3J illustrates creating composite marks. The user selects a circle icon template 366 from a shape palette and places a circle 316 in the visualization region to form a composite mark 370. In some implementations, the additional mark is any shape (e.g., a circle, a square, or a triangle). In response to the user adding the additional mark at a position relative to a first visual mark in the data visualization region, an additional mark is automatically added at a corresponding position for each of the other visual marks in the data visualization region. For example, FIG. 3K illustrates a plurality of composite marks are displayed across the data visualization region, each composite mark consisting of a lower triangle and the newly added circle (ellipse). Each composite mark corresponds to a distinct data value for State (e.g., each visual mark representing the SUM (Sales) for each "State" is displayed with the composite mark). At this point, the additional circles are not linked to any data fields, so they all have the same fixed characteristics (e.g., size, shape, and color). In some implementations, the plurality of additional shapes are initially positioned in the data visualization at a preset position (e.g., all of the additional shapes are aligned with a position at which the user placed the first additional shape). In some implementations, the additional shape is an image (e.g., selected from an image file), or other icon and/or shape that is added to the data visualization.

Figure 3L:
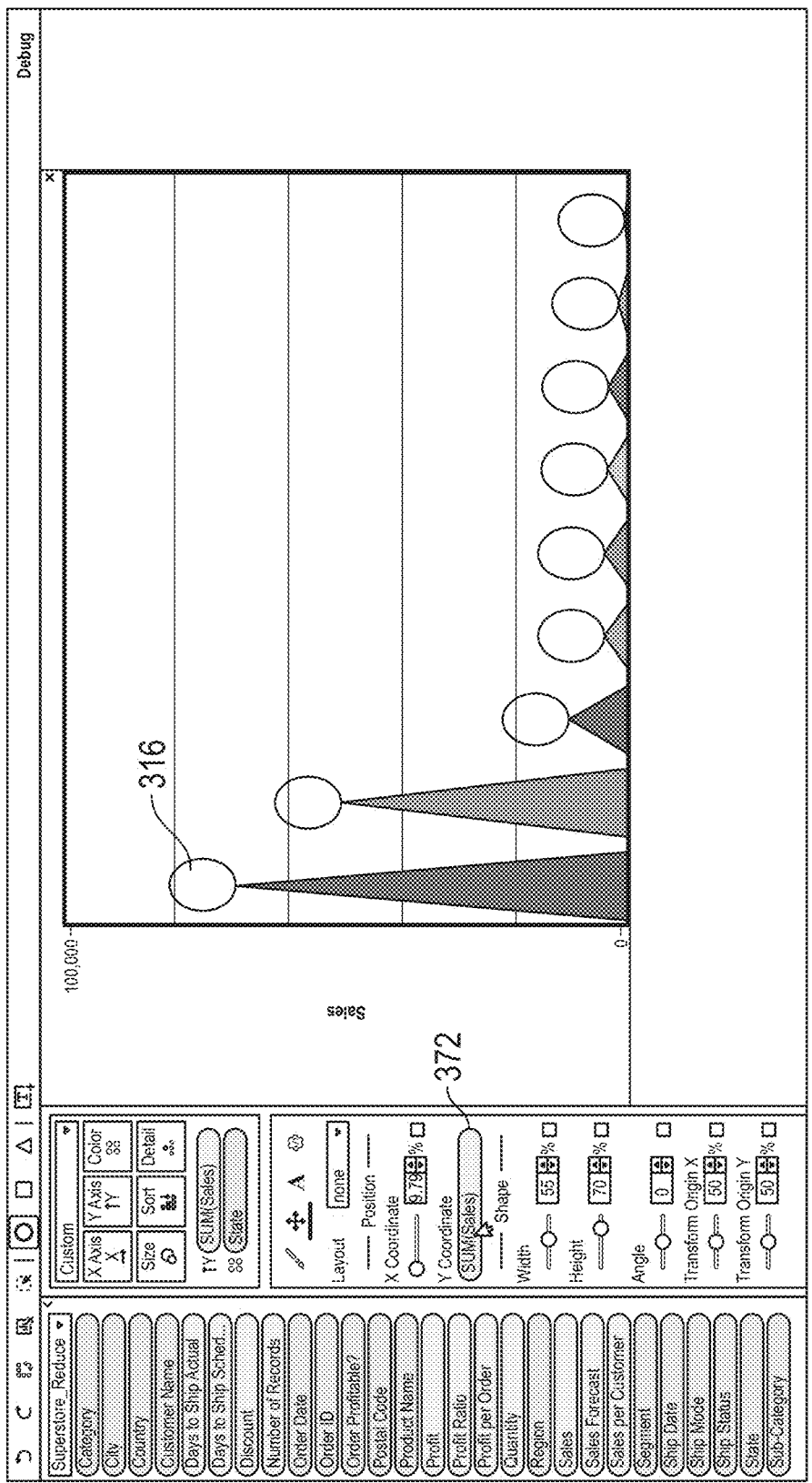

In some implementations, the user can control the positions of the additional shapes, as illustrated in FIG. 3L, by binding different visual properties of the additional shapes to data fields. For example, the user has bound the y-coordinate of the additional shapes to SUM (Sales) 372, which causes the data visualization to display the additional shapes at positions atop the triangles (whose heights are SUM (Sales)), for each State.

Visual properties of the additional shapes are editable by the user in the same way as editing the visual properties of the original visual marks. For example, a fill gradient 376 is added to the circle marks, with a color for the gradient and an orientation (e.g., linear or radial) of the gradient selected by the properties 374, as illustrated in FIG. 3M.

Figure 3M:
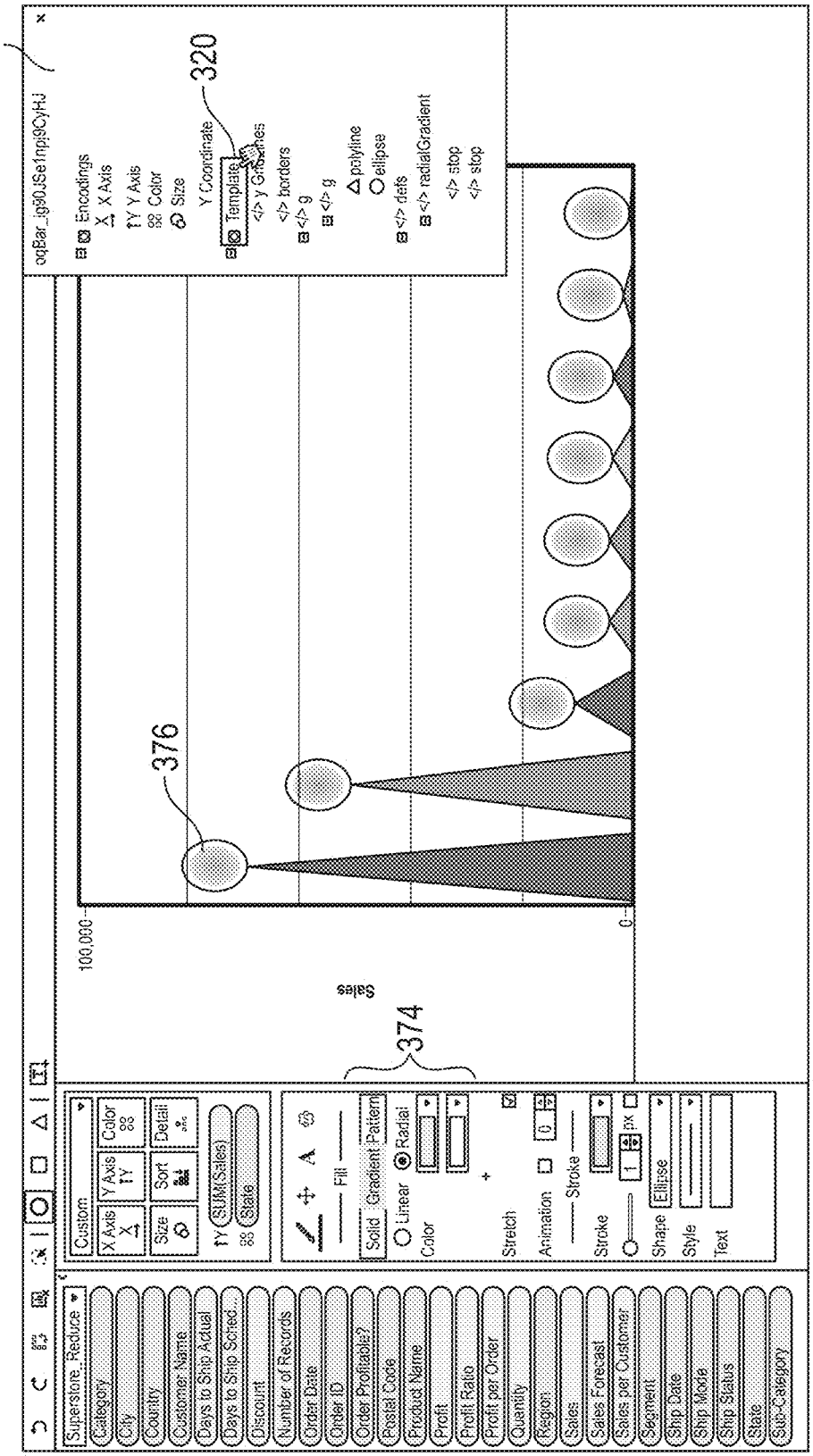
Figure 3N:
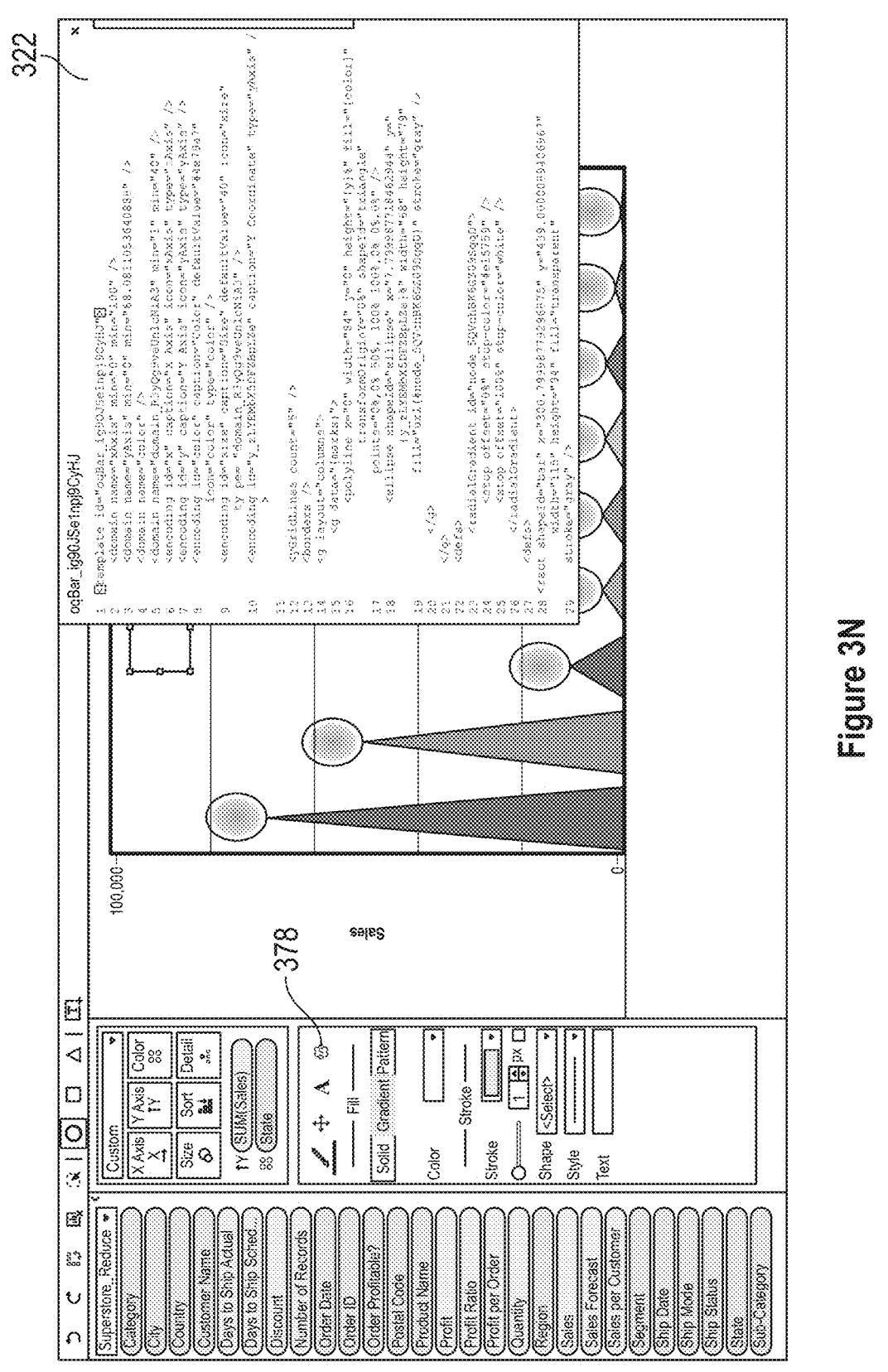

In some implementations, the electronic device automatically generates a scene graph tree 318, which represents the visual encodings for the current data visualization, as illustrated in FIG. 3M. In some implementations, the scene graph tree can also be converted to an SVG format, as illustrated in FIG. 3N. For example, the user selects "template" 320, and the electronic device displays the SVG template 322 illustrated in FIG. 3N. For example, the visual encodings for the data visualization are exported so that the user may recreate the data visualization and/or embed the data visualization in another program. For example, a user can easily insert the data visualization, with all of the visual encodings (e.g., including animations, described in more detail below), to a website, a messaging application, presentation application, and various other applications by inserting the automatically generated SVG template. Thus, the user is able to create the data visualization using drag and drop techniques, and is able to export the SVG template without additional user input required to manually generate the SVG template. In some implementations, a user can see the content of the SVG template and/or XML encoding of a data visualization by selecting the encoding icon 378. In some implementations, a user can manually edit the XML or SVG template, and the data visualization updates accordingly.

Figure 4A:
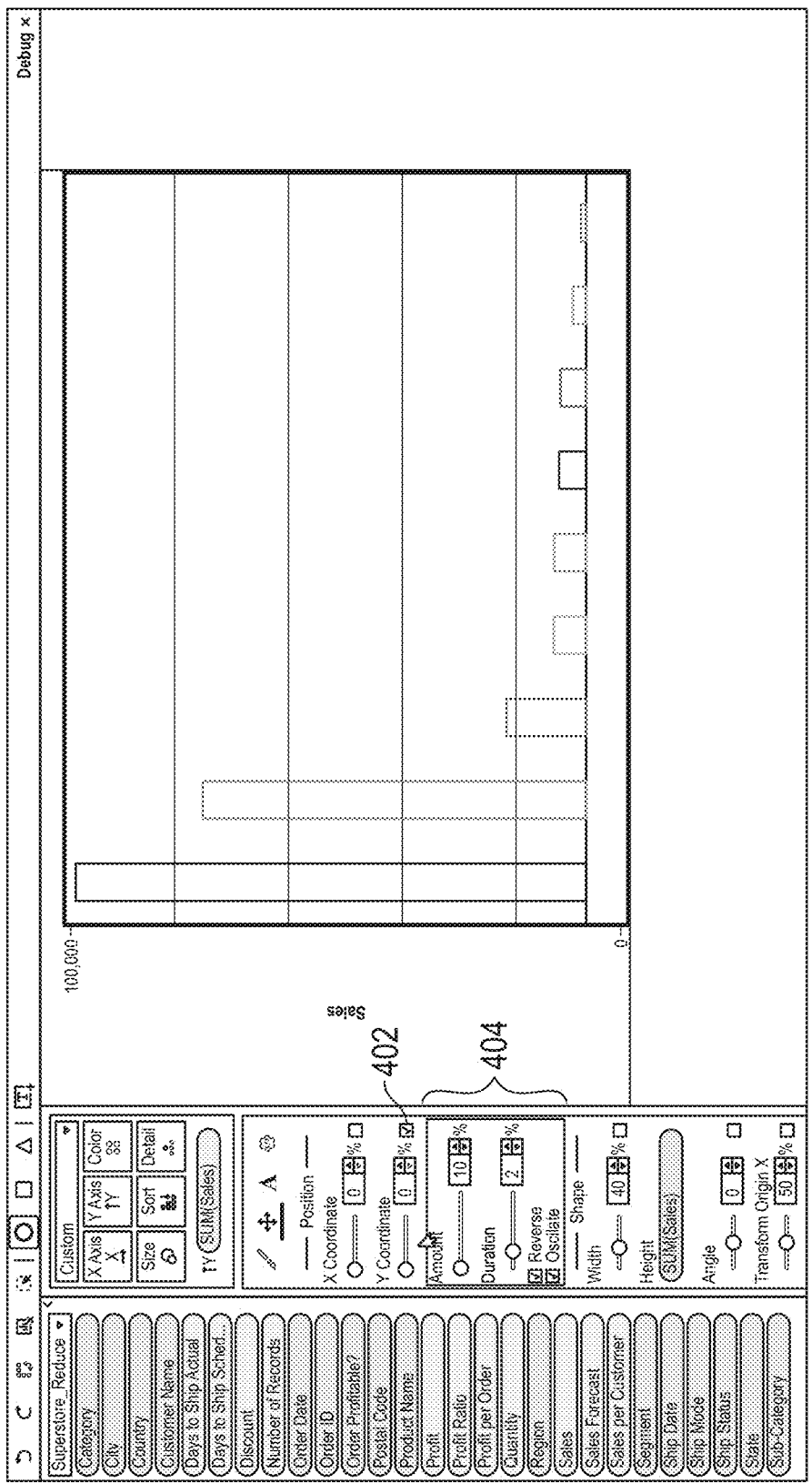
FIGS. 4A-4C illustrate animated data visualizations that are updated in accordance with user interaction according to some implementations.
Figure 4B:
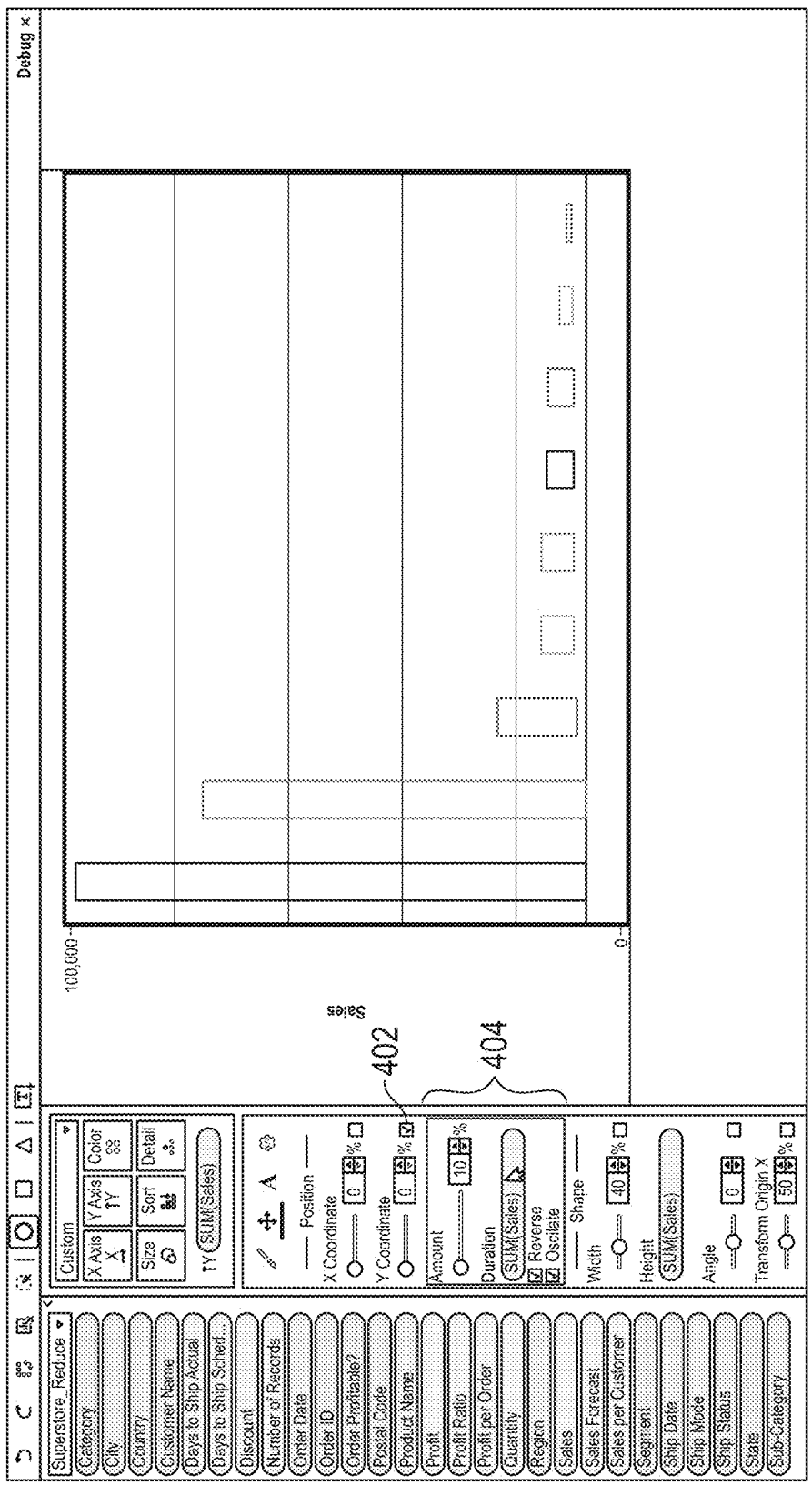
Figure 4C:
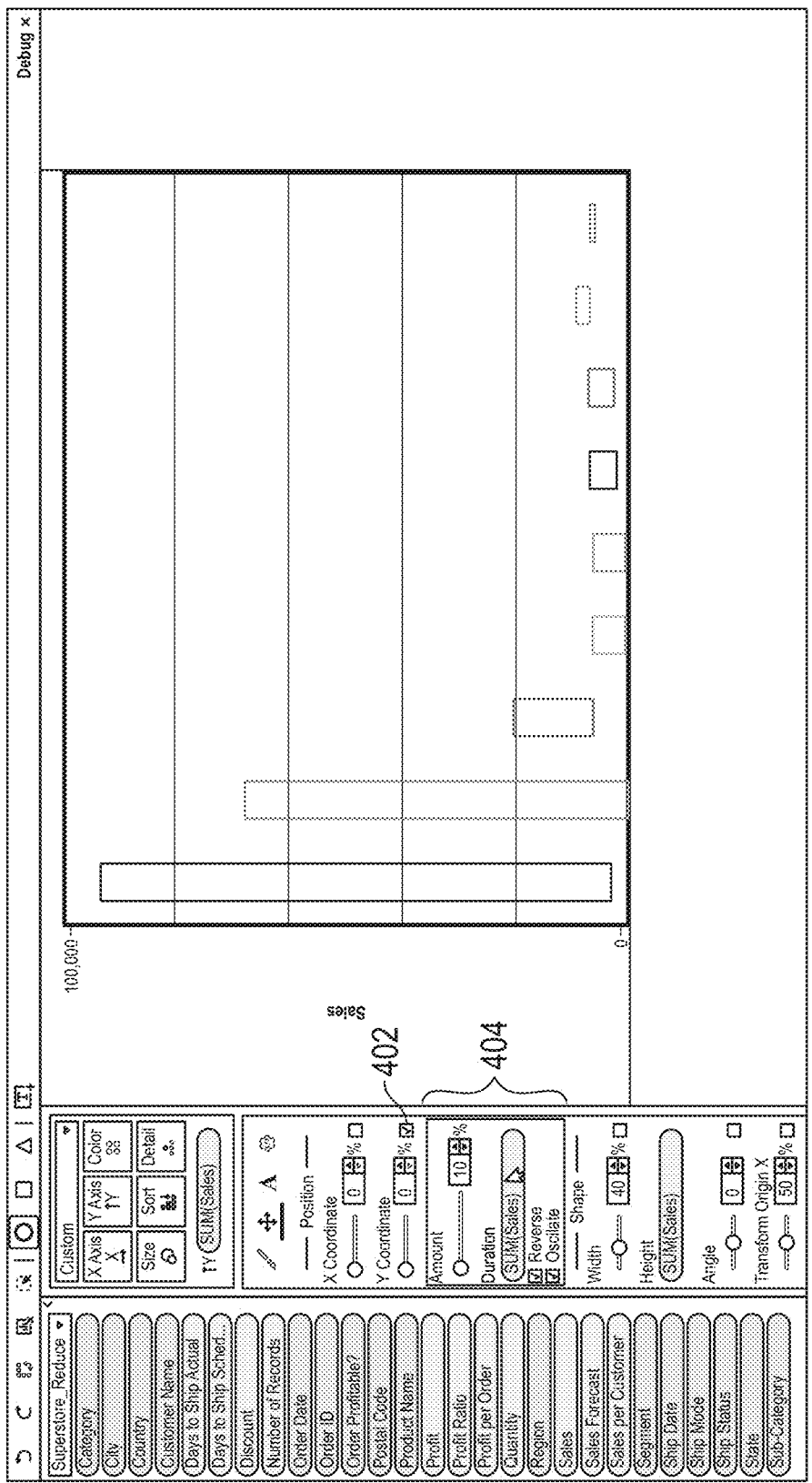

FIGS. 4A-4C illustrate example user interfaces for applying an animation to a visual property of visual marks in a data visualization, in accordance with some implementations. As described with reference to FIGS. 3A-3C, FIG. 4A illustrates SUM (Sales) bound to the y-axis of the data visualization displayed (i.e., the height of each bar in FIG. 4A represents the aggregated value of the "Sales" data field for a State). FIG. 4A illustrates the user selecting animation for change in vertical position of the visual marks. In FIG. 4A, the user has selected the animation check box 402 for "Y-coordinate." The check box 402 triggers animation of the y-coordinate. In response to the user selecting check box 402 additional animation options 404 are displayed for the user, including "amount," "duration," "reverse," and "oscillate." After the user has selected to animate the visual marks, the user can select how much to oscillate the bars up and down (e.g., amount) along the Y-axis, and a speed (e.g., duration) of the animation.

FIGS. 4B and 4C illustrate binding the animation of the visual marks to a data field. The user drags the data field icon for "Sales" to the duration of the animation, which binds the amount of movement to the data field "Sales" (e.g., an aggregated value of the data values for "Sales," grouped by State). In FIGS. 4B and 4C, each bar in the bar chart is animated to move vertically (e.g., by changing the "y-coordinate" by an amount of 10%), moving upwards and downwards (e.g., oscillating). In some implementations, the animation of the visual marks appears at different rates (e.g., as some visual marks move upwards, other visual marks move downwards) to create movement of the visual marks over time.

Figure 5A:
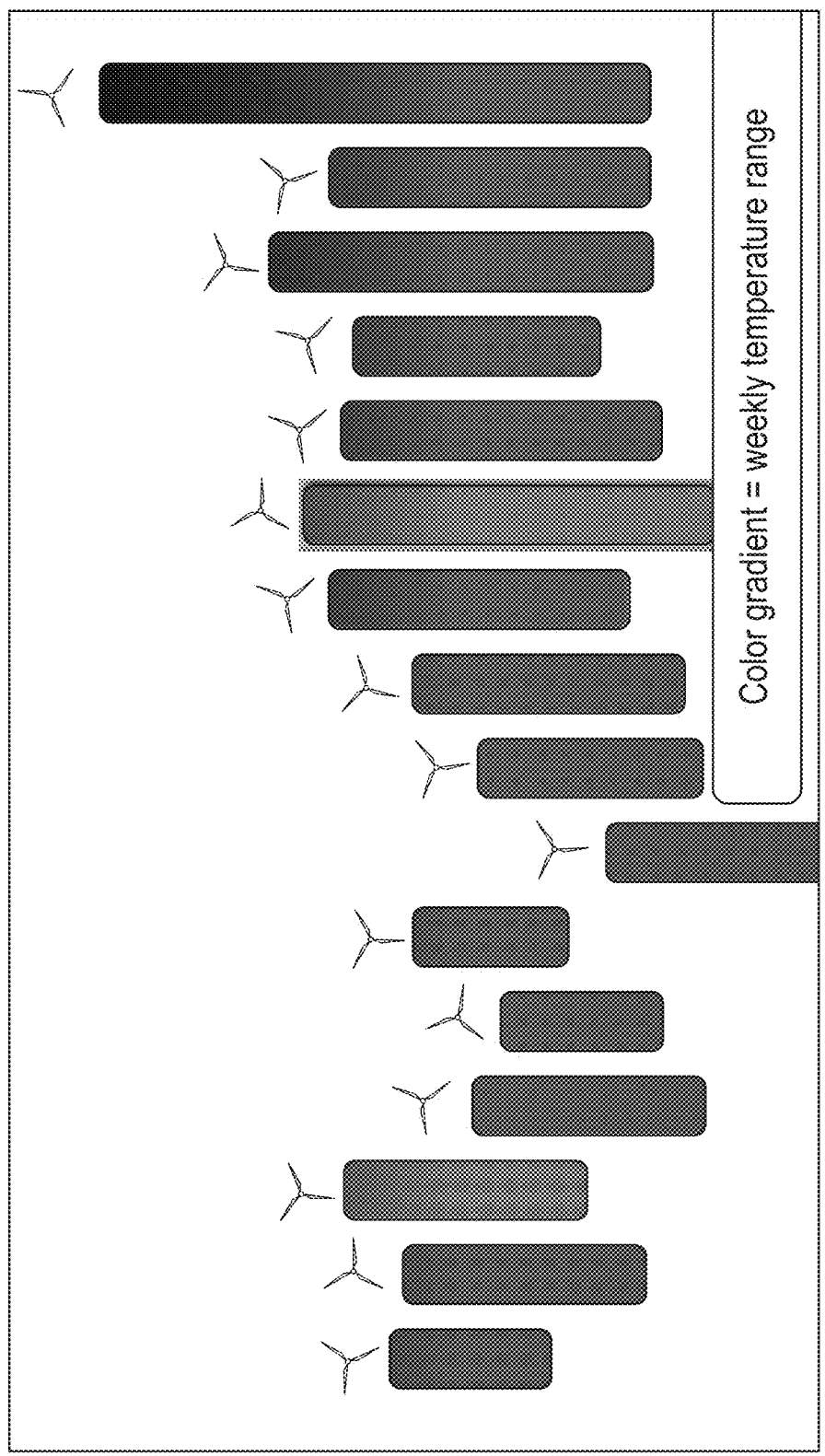
FIGS. 5A-5J illustrate an example of an animated data visualization based on a plurality of data field icons according to some implementations.
Figure 5B:
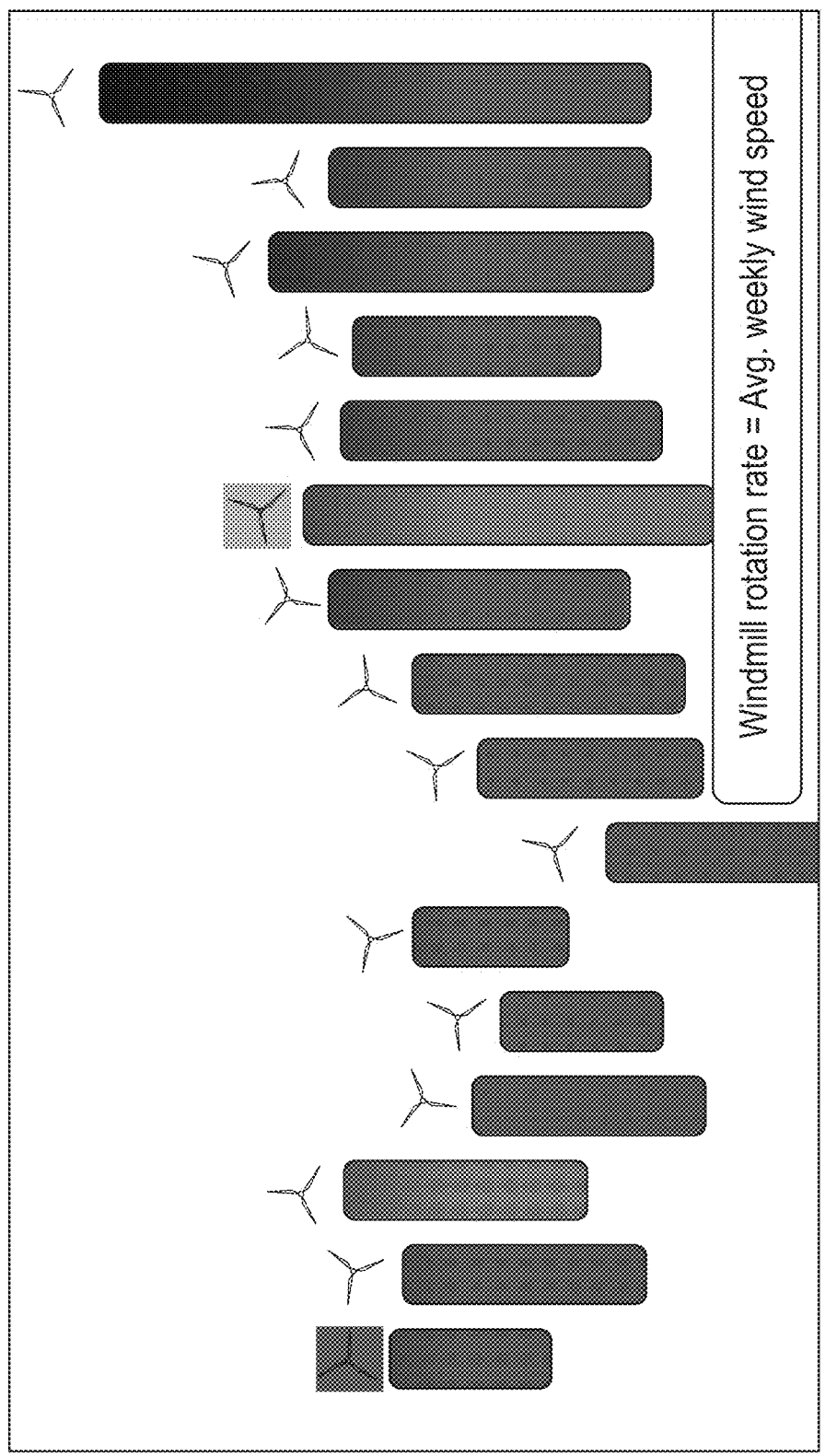
Figure 5C:
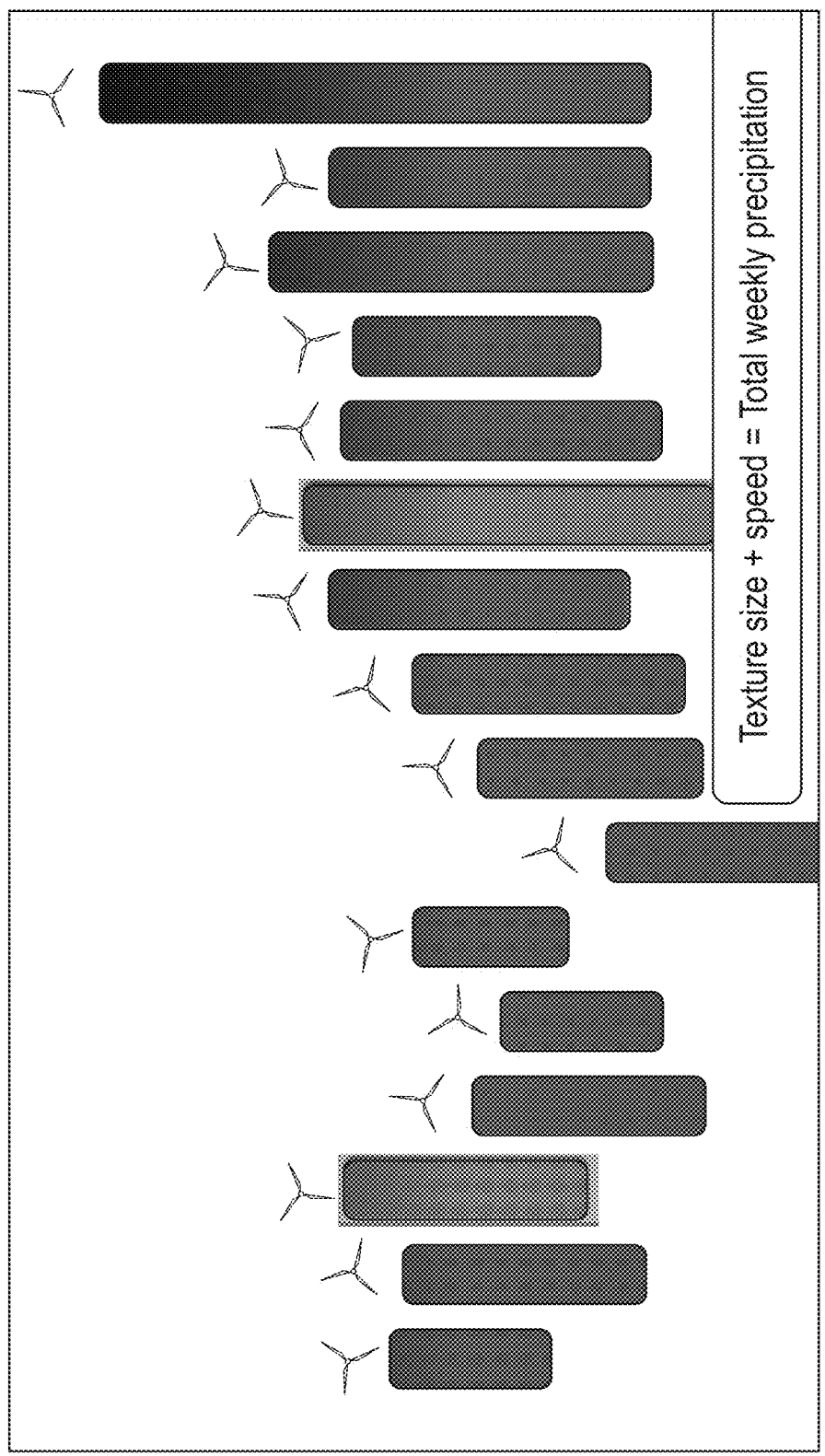

FIGS. 5A-5J provide an example of generating an animated data visualization using techniques described above with reference to FIGS. 3A-3N and 4A-4C. FIGS. 5A-5C illustrate an animated data visualization (e.g., that is generated by the user inputs illustrated in FIGS. 5D-5J). As shown in FIG. 5A, the color gradient of each of the bars (e.g., the gradient fill in the bars of the bar chart) is bound to a data field for the "weekly temperature range". FIG. 5B further illustrates that the rate of rotation of a mark portion (e.g., the windmills bound to the top of each bar) is bound to a data field for the "average weekly wind speed". FIG. 5C illustrates that the size of the pattern of the fill of the bars (e.g., the size of the texture pattern that appears as drops of water that fill the bars), as well as the rate of movement (e.g., speed) of the pattern (e.g., as the drops appear to fall within the bars), are bound to a data field for "total weekly precipitation". Thus, each composite mark is displayed with different visual properties, including different gradients, mark rotation speeds, and fill patterns (e.g., in size and animation speed), based on the respective data values for the data field that is bound to the different visual properties.

FIGS. 5D-5J illustrate how a user can create the animated data visualization shown in FIGS. 5A-5C, in accordance with some implementations. For example, in FIG. 5D, the user binds the y-coordinate of the visual marks (e.g., the y-coordinate of the bars) to the SUM of the data field "Temperature Min" 550. In addition, the user binds the height of the bars to "SUM (Temperature Diff)" 552. Accordingly, each of the bar marks is positioned with a y-coordinate measured from the data value for the minimum temperature in the data field (e.g., for each week), and with a height that represents the difference between the high and low temperatures (e.g., for each week).

Figure 5D:
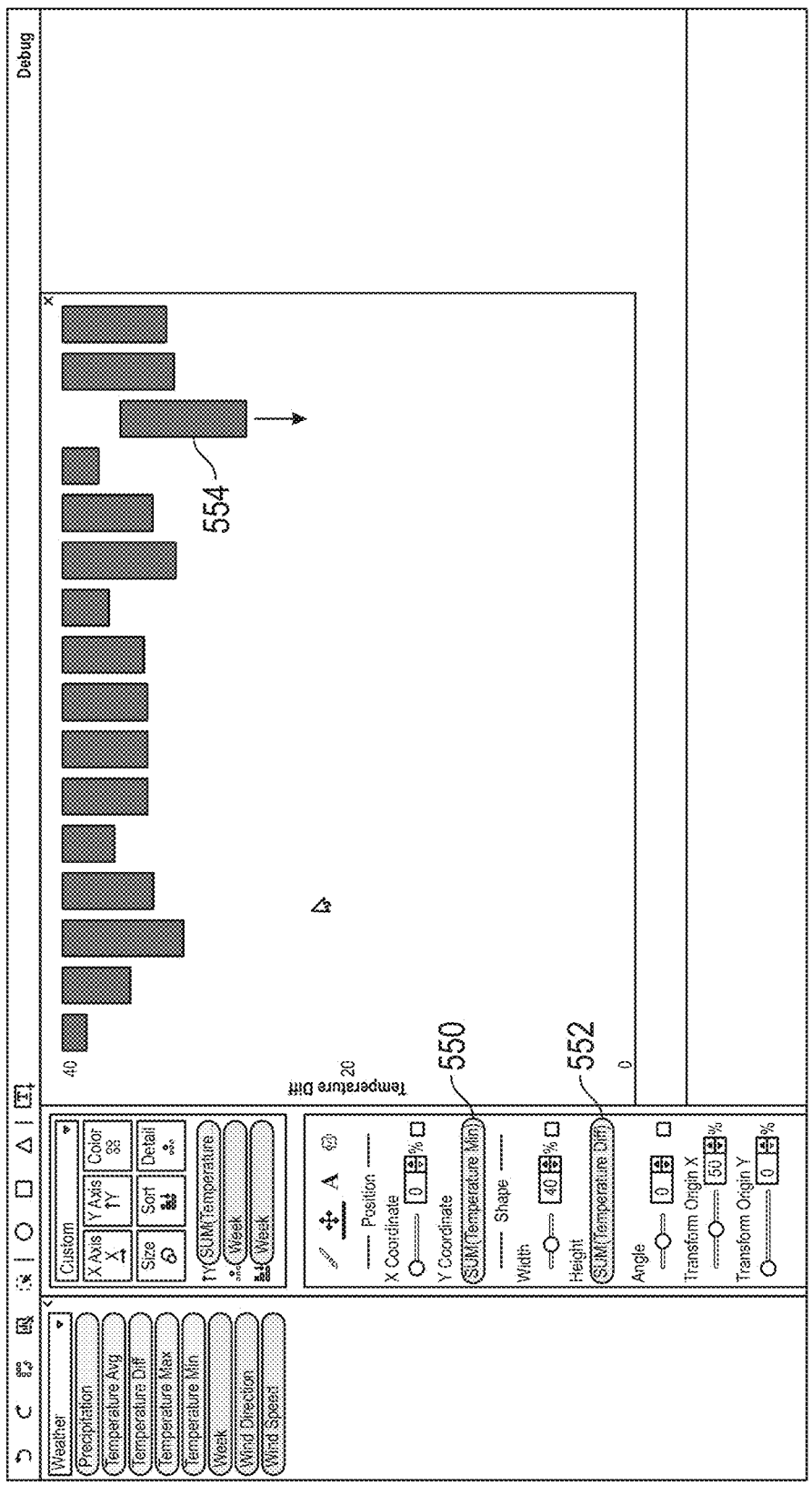
Figure 5E:
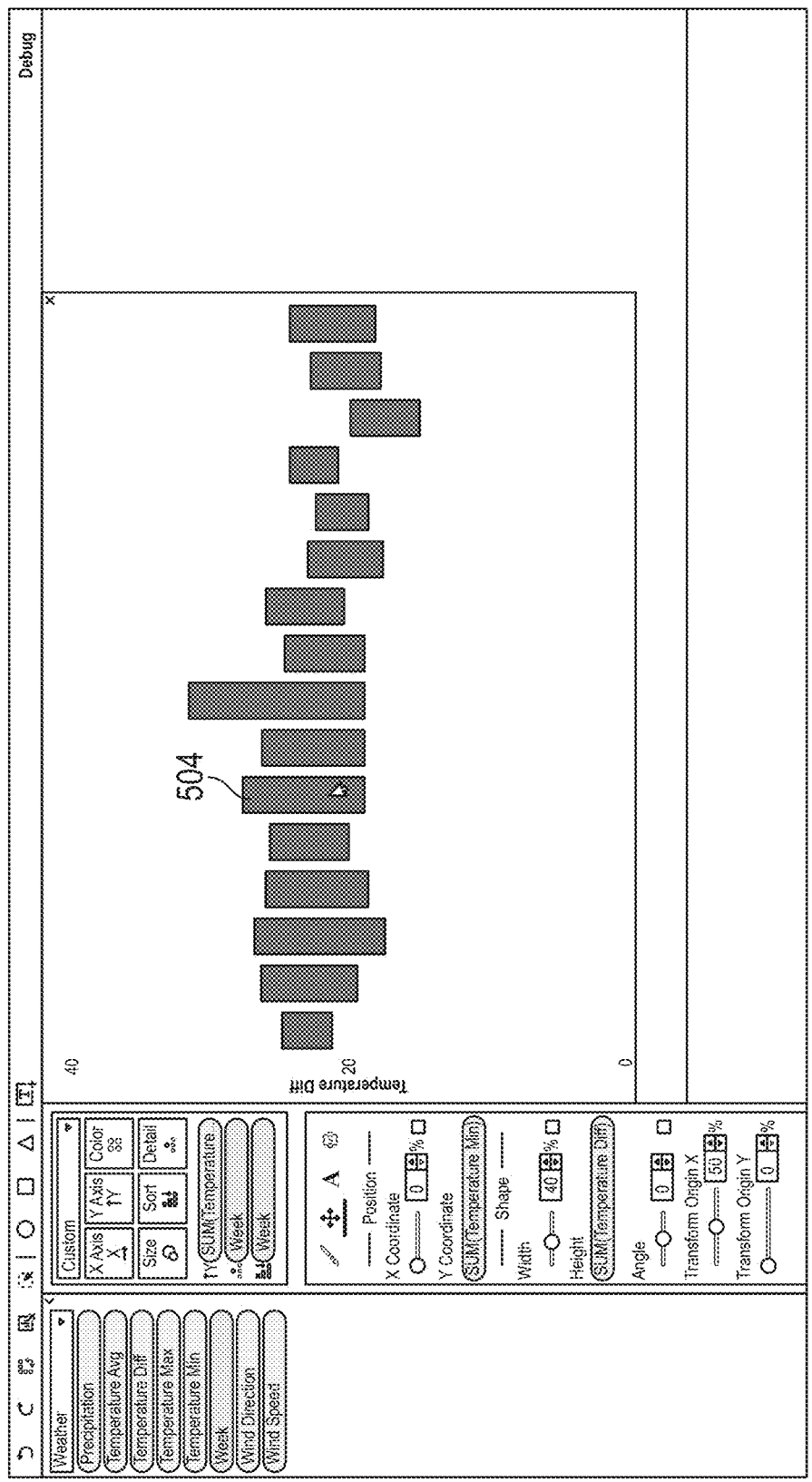

The user also changes the mark position of one bar 554 in FIG. 5D, which causes the visual marks to move from the top of the data visualization region, to the middle, as shown in FIG. 5E. FIG. 5E further illustrates the user selecting a visual mark 504 (e.g., a bar) in the data visualization.

Figure 5F:
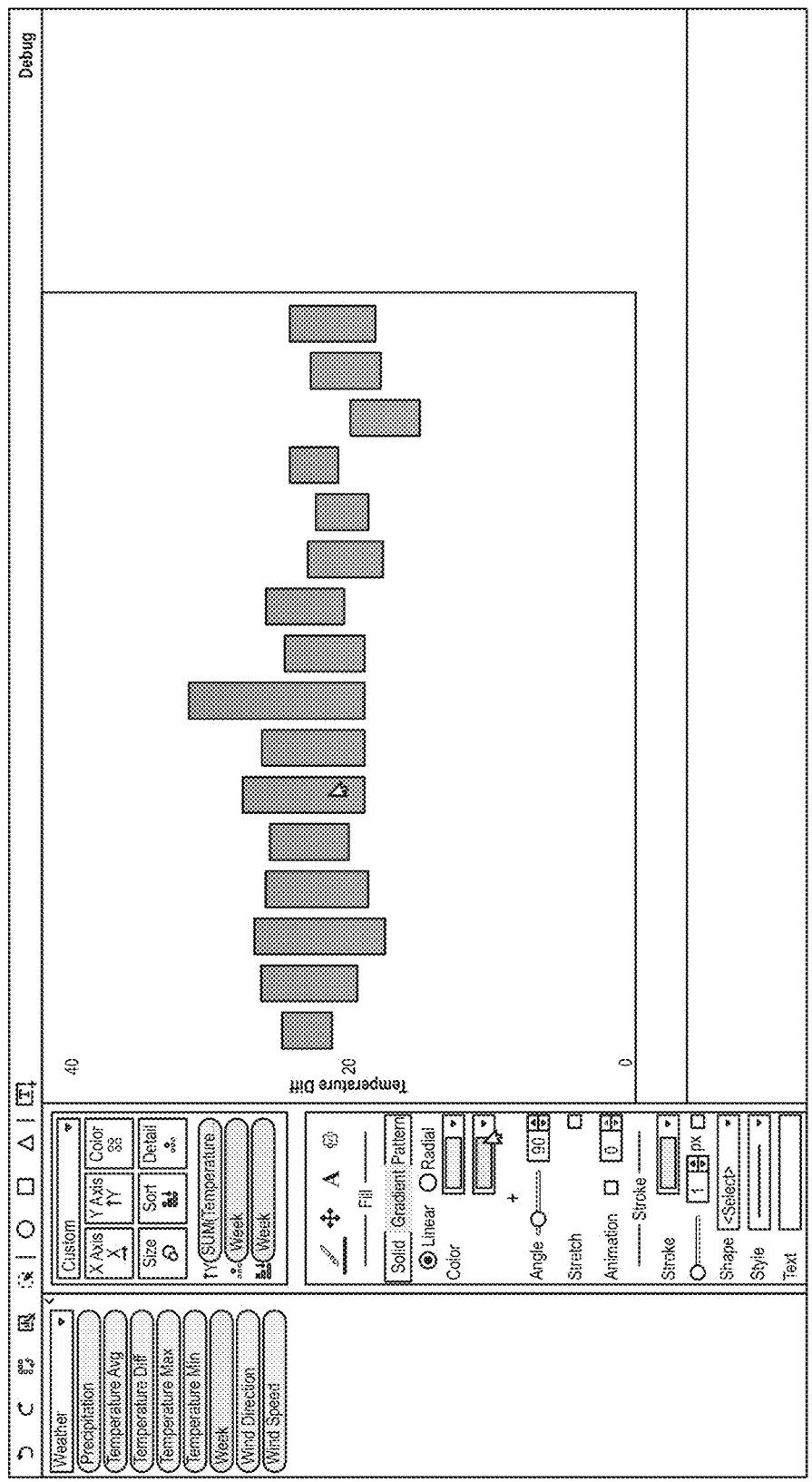

FIG. 5F illustrates the user modifying a visual property of the visual marks (e.g., adding a gradient fill to the marks), including selecting two (e.g., or more) colors for the gradient to fill the visual marks (e.g., to fill the bars in the bar chart). In some implementations, because the height of the bars is tied to the temperature differential, the color gradient for the fill pattern of the bars is tied to the temperature differential.

Figure 5G:
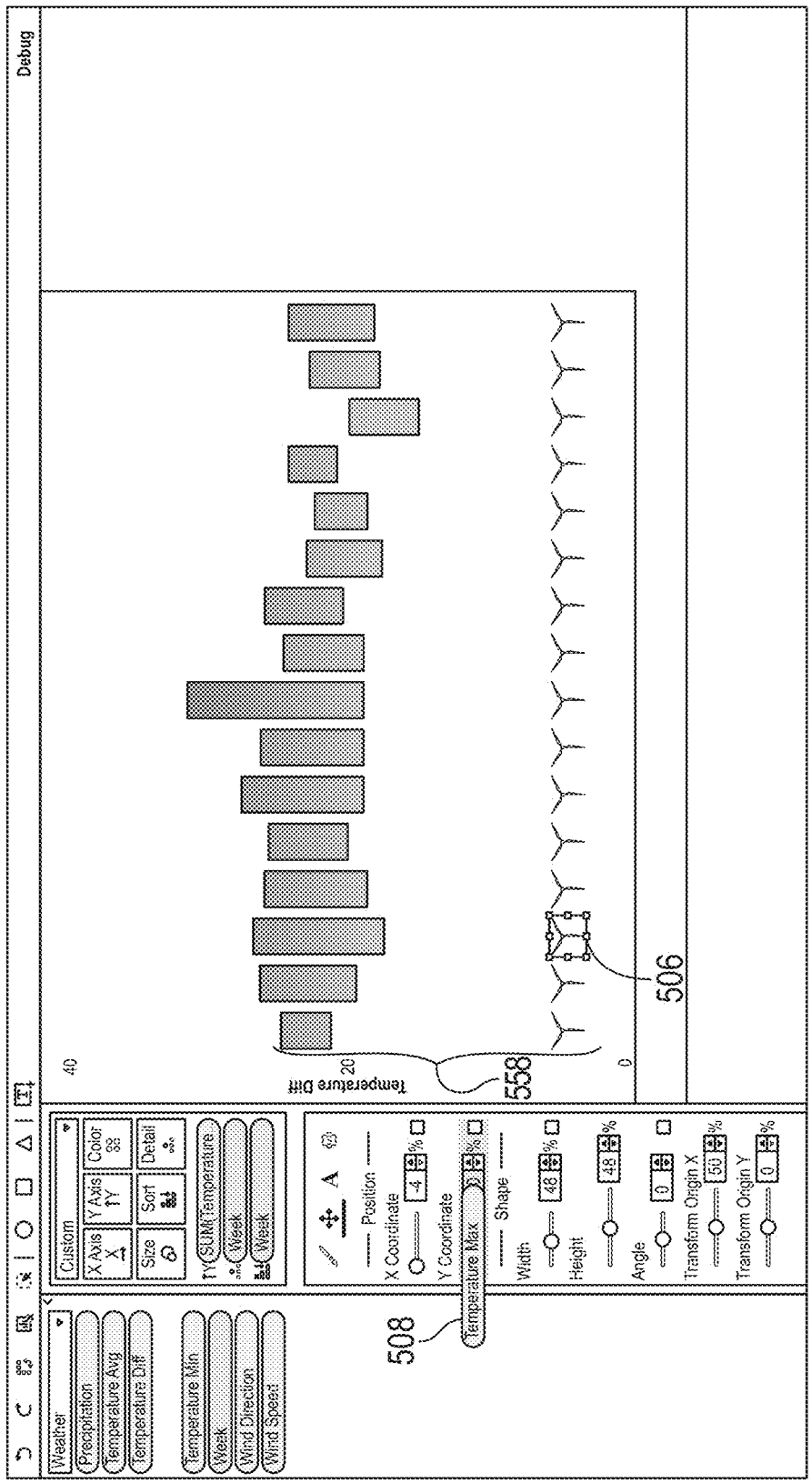
Figure 5H:
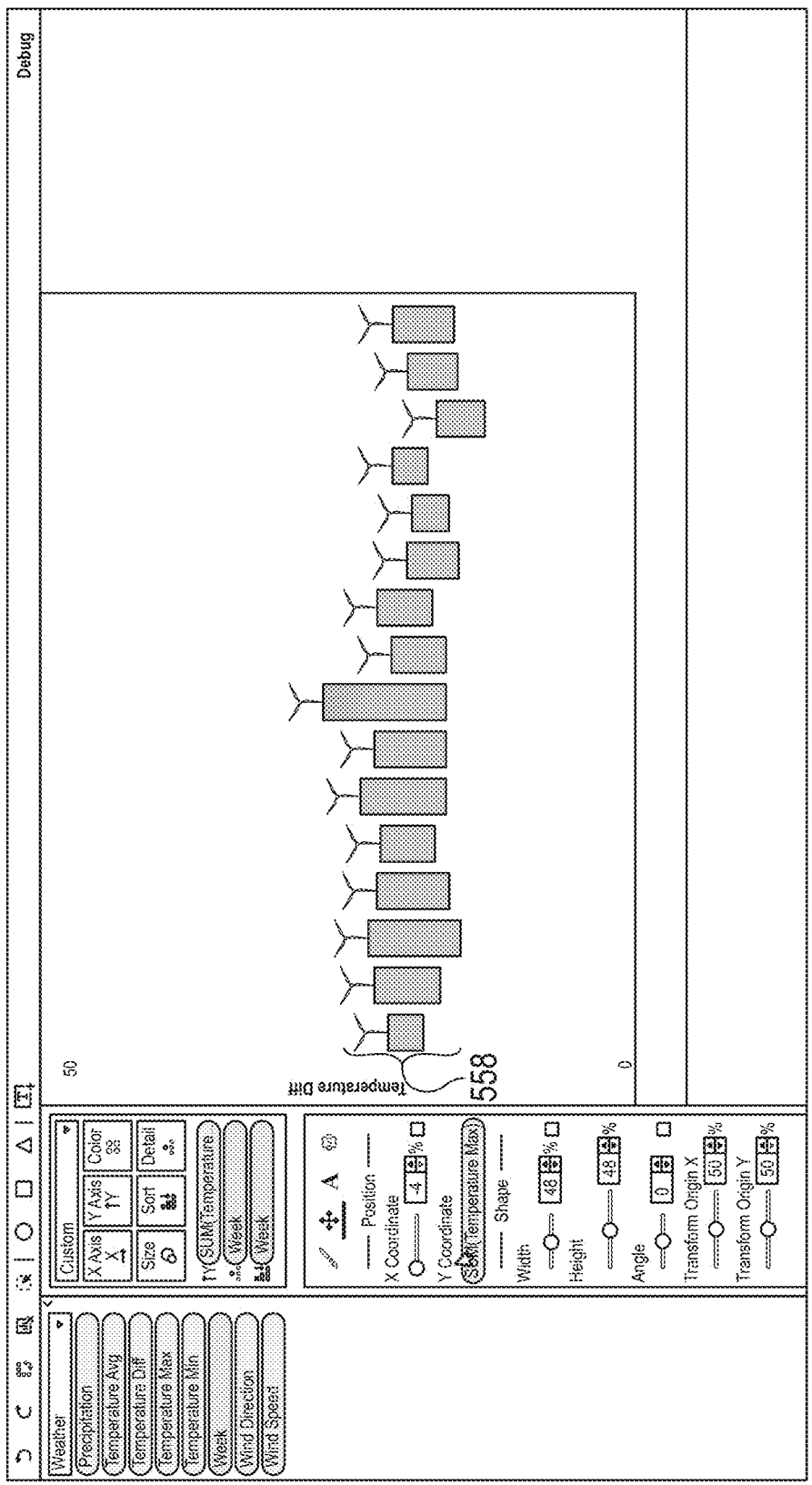

In FIG. 5G, the user adds an additional image mark 506 to the data visualization. The user has added a windmill icon 506 (e.g., dragging an icon from the user's desktop) to form composite visual marks 558. While the windmill mark 506 is selected, the user drags the data field icon "Temperature Max" 508 to the "y coordinate" visual property, which binds the y-coordinate of the composite visual marks (e.g., the windmill icons) to the maximum temperature. This is at the top of each bar in the bar chart, as illustrated in FIG. 5H.

Figure 5I:
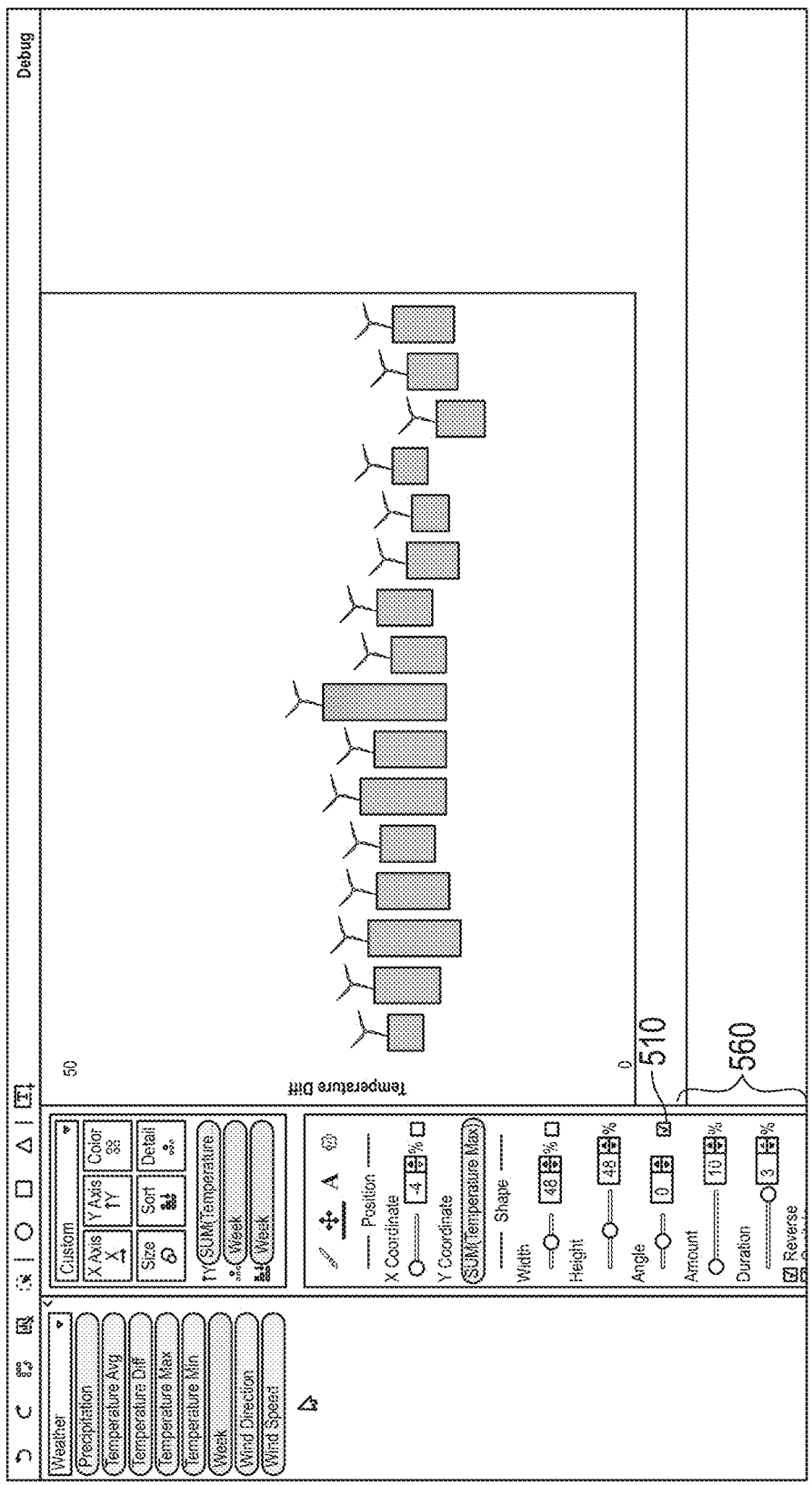

FIG. 5I illustrates the user checking the animation check box 510 for the angle of the windmill icons, which causes the computer system to display animation options 560 for animating the windmill icons. For example, in FIG. 5I, the user selects an amount and duration of the animation of the "angle" of the visual mark, thus rotating the windmill icons at a particular speed. The animation options also include "reverse" and "oscillation." Check boxes are provided to indicate whether these options apply. These options can be used to make sure the animation has a behavior that makes sense to viewers. For example, when animating rain, it needs to be continuously falling rather than rising or oscillating between falling and rising. The reverse check box specifies the direction of the animation and the oscillation check box specifies whether the animation oscillates or is continuous.

Figure 5J:
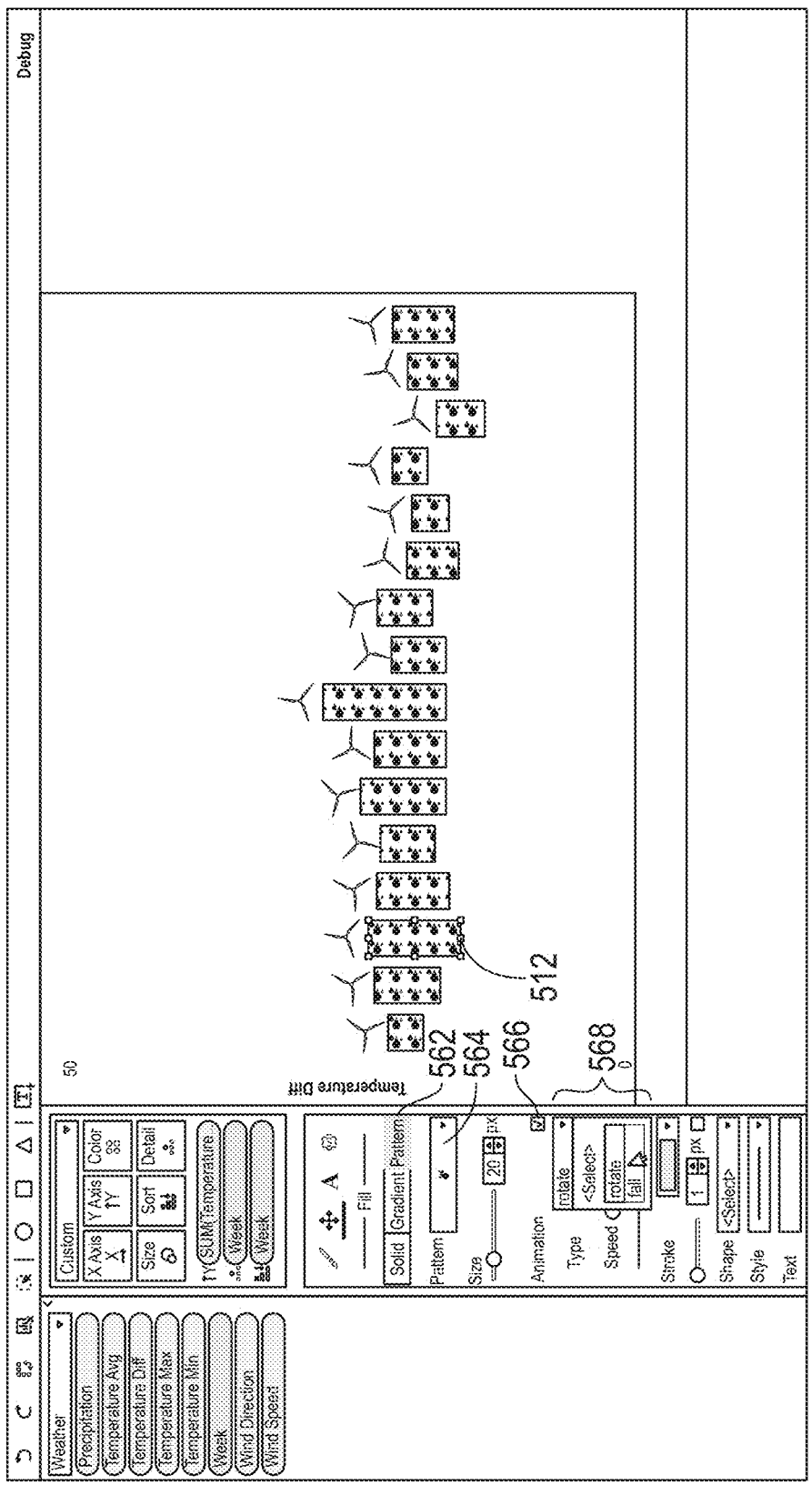

FIG. 5J illustrates the user selecting a bar 512 of the bar chart, selecting the pattern option 562, and adding a fill pattern 564 (water drops) for the bars. In some implementations, the fill pattern is displayed concurrently with the fill color (e.g., the fill gradient), as illustrated in FIGS. 5A-5C. FIG. 5J further illustrates the user animating the fill pattern by selecting the animation check box 566. For example, the user can select an animation type of the pattern to "rotate" or "fall" from the options 568. Thus, the user animates the fill pattern for visual marks in the data visualization. The user also binds the size of the fill pattern to the data field of "Precipitation" (i.e., the larger the data value for SUM (Precipitation), the larger the fill pattern).

Figure 6A:
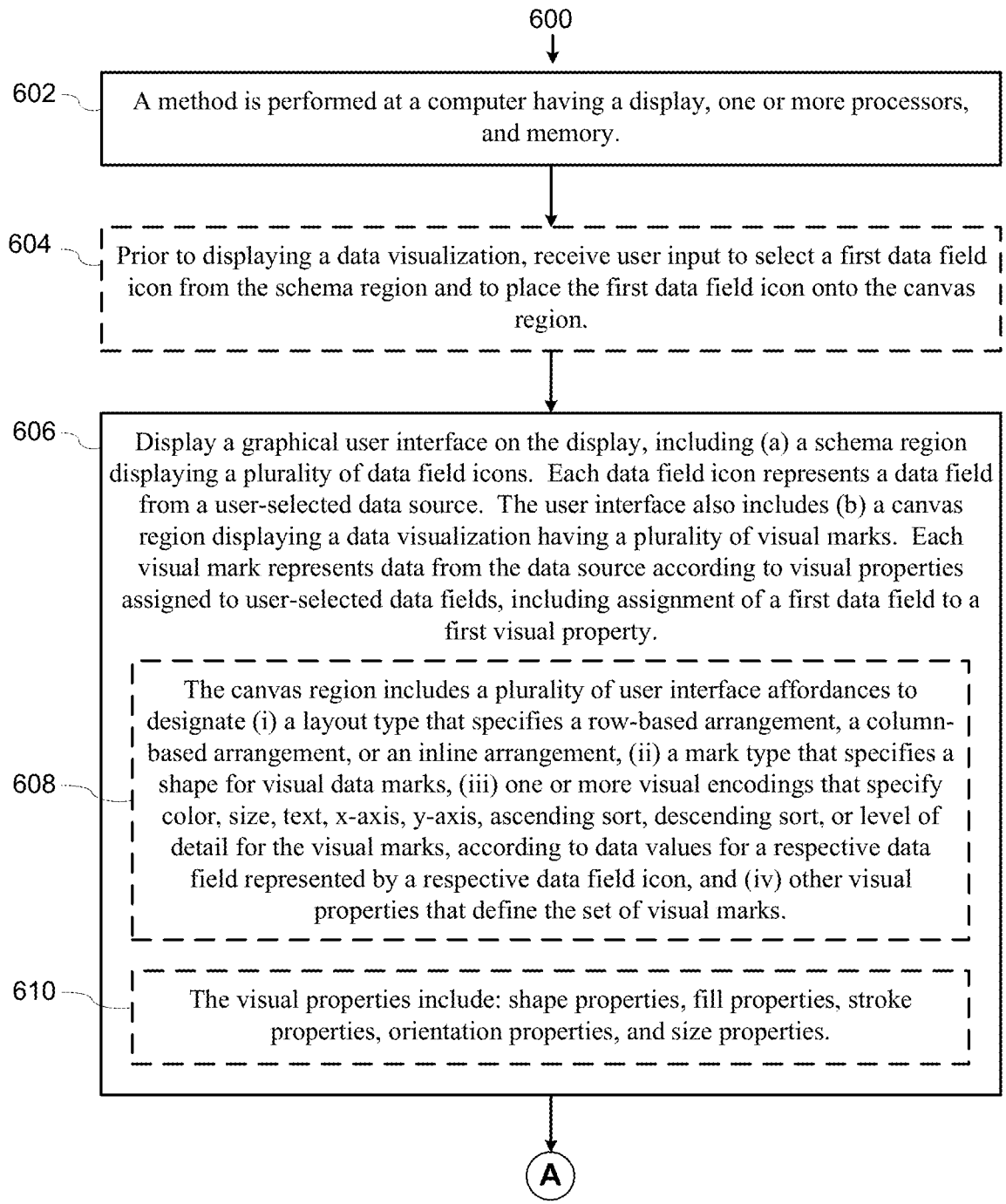
FIGS. 6A-6C provide a flowchart of a process for animating data visualizations according to some implementations.
Figure 6B:
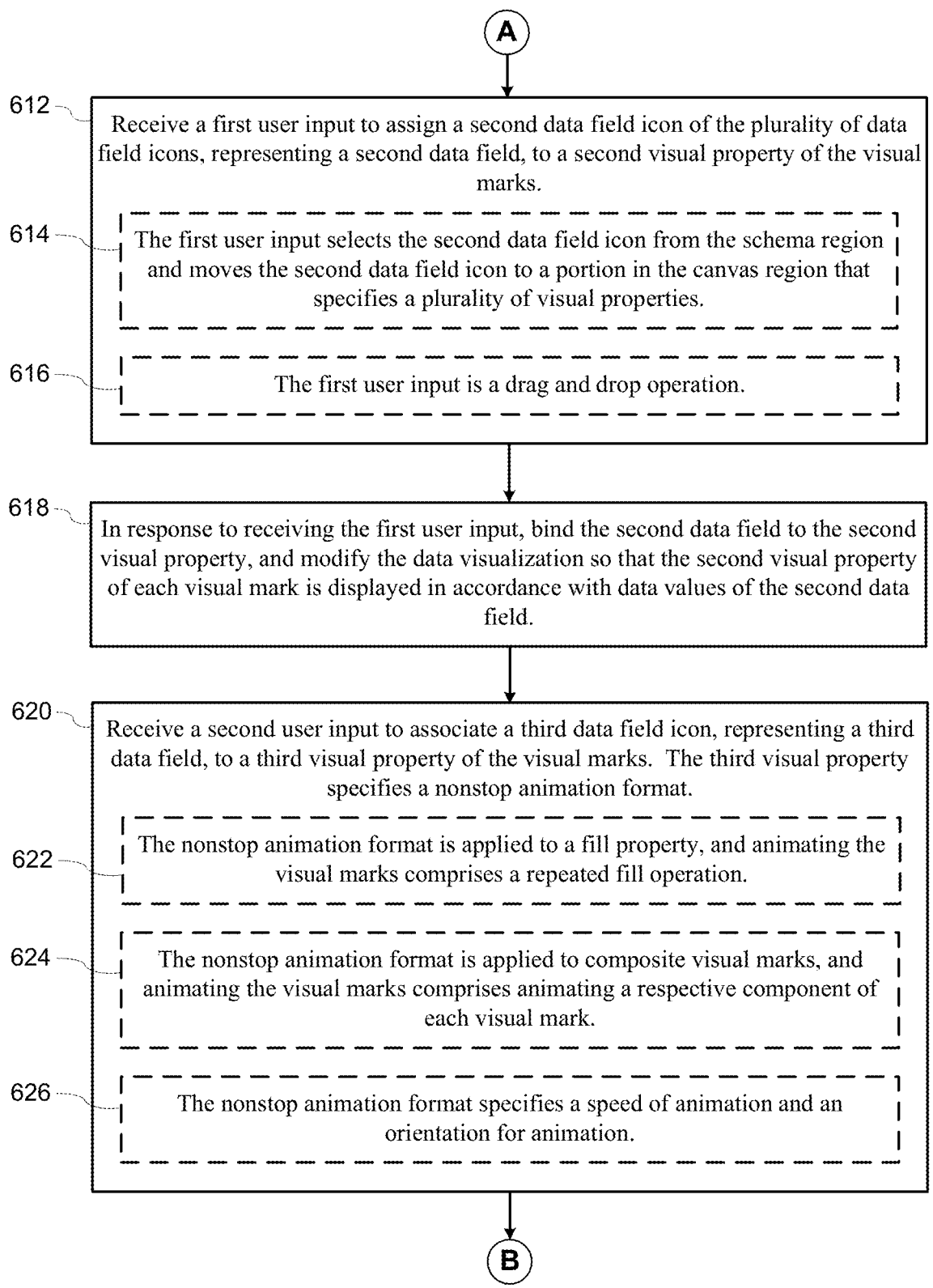
Figure 6C:
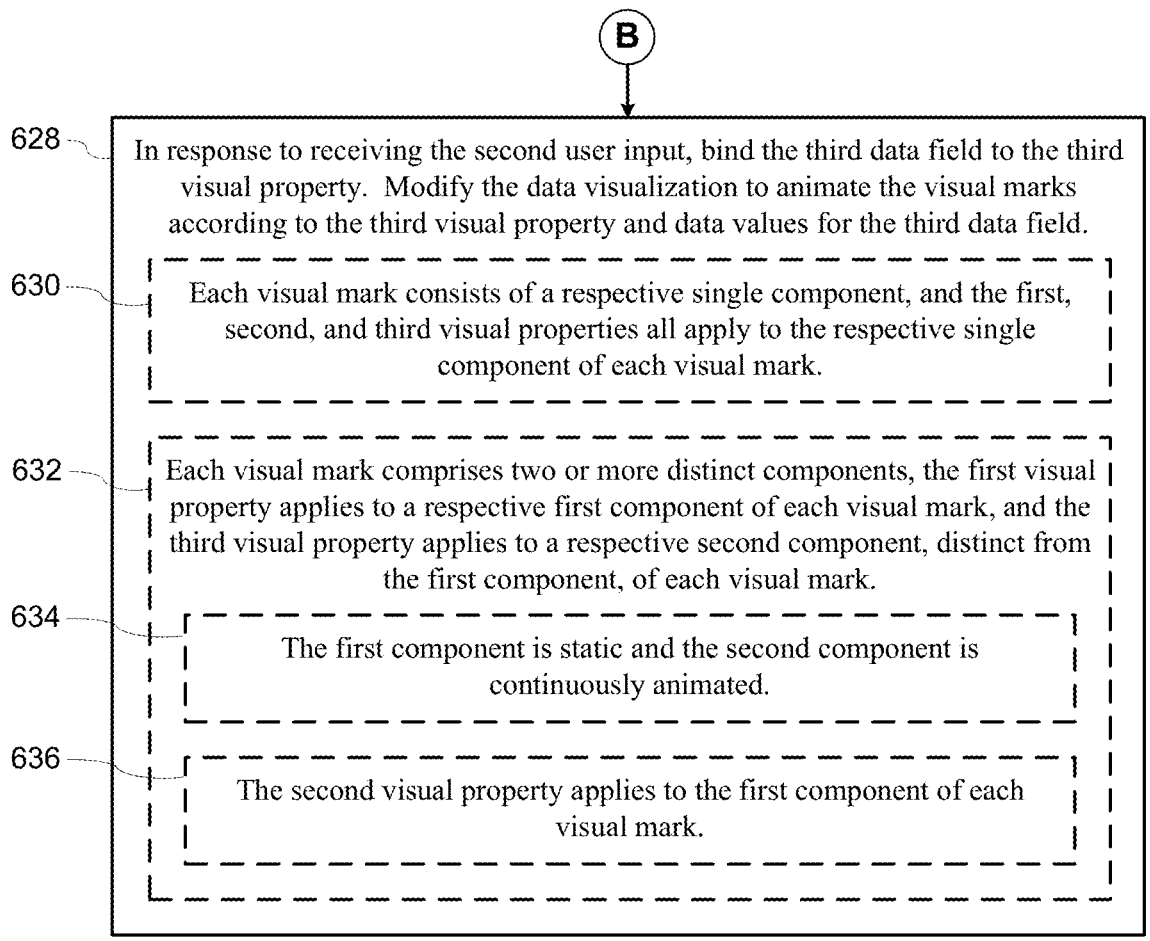

FIGS. 6A-6C provide a flowchart of a process 600 for animating data visualizations. The process is performed (602) at a computer system having one or more processors, a display, and memory. The memory stores one or more programs configured for execution by the one or more processors.

In some implementations, prior to displaying a data visualization, the computer system receives (604) user input to select a first data field icon from a schema region and to place the first data field icon onto a canvas region (and binds a corresponding data field to a first visual property). For example, as described with reference to FIGS. 3A-3C, the user initializes the data visualization by dragging the Sales data field icon onto the canvas region. The computer system aggregates the Sales data.

The computer system displays (606) a graphical user interface on the display, including (a) a schema region (e.g., the schema region 110) displaying a plurality of data field icons, each data field icon representing a respective data field from a user-selected data source. The graphical user interface also displays (b) a canvas region (e.g., regions 302 and 112 in FIG. 3A). The canvas region displays a data visualization having a plurality of visual marks. Each visual mark represents data according to visual properties. For example, each visual mark is displayed with a plurality of visual properties, which can be updated by a user. A user can update the data visualization to change the visual properties that specify the x-coordinate, y-coordinate, width, height, angle, animation, color, fill, and/or outline.

In some implementations, the canvas region includes (608) a plurality of user interface affordances to designate (i) a layout type that specifies a row-based arrangement, a column-based arrangement, or an inline arrangement, (ii) a mark type that specifies a shape for visual data marks, (iii) one or more visual encodings that specify color, size, text, x-axis, y-axis, ascending sort, descending sort, or level of detail for the visual marks, according to data values for a respective data field represented by a respective data field icon, and (iv) other visual properties that define the set of visual marks. In some implementations, as described with reference to FIGS. 3A-3D, the computer system generates and displays a data visualization for the data source according to the layout type, mark type, and visual encodings specified on the block card.

In some implementations, the visual properties include (610): shape properties, fill properties (e.g., a fill color, a fill pattern, and a fill gradient), stroke properties (e.g., a color, a line width, and a style), orientation properties (e.g., x-coordinate and y-coordinate), and size properties (e.g., width and height). In some implementations, composite marks (i.e., visual marks consisting of two or more components, such as the bar and windmill combinations 558 in FIG. 5H) have additional shapes, icons, or images that are added to the data visualization in addition to the original visual marks. A user can separately define visual encodings and automation for each of the components of the visual marks.

The computer system receives (612) a first user input to assign a second data field icon of the plurality of data field icons, for a second data field, to a second visual property of the visual marks. For example, the visual marks are initially displayed with a first set of visual properties, and the user can change one or more of the initial visual properties of the visual marks. For example, as described with reference to FIGS. 3G-3H, the user selects a bar in the bar chart, and updates the visual property of "width" for the bars from an initial width (e.g., where the width is the same for each visual mark in the data visualization), to a width that is determined based on "SUM (Profit)" (e.g., the width for each visual mark is bound to a data value for SUM (Profit), so that the width of each bar varies by State).

In some implementations, the first user input selects (614) the second data field icon from the schema region and moves the second data field icon to a portion in the canvas region that specifies a plurality of visual properties.

In some implementations, the user input is (616) a drag and drop operation. For example, the user drags the icon for "Sales" to the portion of the canvas region that corresponds to the visual property "y coordinate-duration" in FIG. 4B.

In response to receiving the first user input, the computer system binds (618) the second data field to the second visual property and modifies the data visualization so that the second visual property of each visual mark is displayed in accordance with data values of the second data field. For example, in FIG. 3H, the data visualization is updated to show the bars with different widths, according to the data value of SUM (Profit) for the respective State.

In some instances, the computer system receives (620) a second user input to associate a third data field icon, representing a third data field, to a third visual property of the visual marks. The third visual property specifies a nonstop animation format. The "nonstop" nature of the animation is illustrated by the spinning windmill and the continuous falling rain in FIG. 5J. Note that this animation is fundamentally different from an animated transition from a first state to a second state. In an animated transition, a data visualization is initially static, undergoes an animated transition to the second state, and then statically displays the second state.

Note that the animation can also be turned on without associating the third visual property with a data field. The association with a data field enables the animation for different data marks to be different (e.g., some of the windmills spin faster than others). When turned on without associating with a data field, the parameters of the animation apply in the same way to all of the data marks that are animated (e.g., all of the windmills spin at the same rate). A single data visualization can also include animations of both types. For example, binding the windmill spinning speed to a data field that represents wind speed, but having the rain falling at the same rate for each of the marks. Further, for a single animated component, a user may bind some of the animation parameters to data fields while having other parameters controlled by a static value. For example, the animation of the raindrops may use the same falling speed and angle of the falling for all of the data marks, but animate the size of the drops according to a data field representing rainfall for each day. In some instances, a user might also bind the angle of falling to a data field (such as windspeed). Thus, a user can independently decide whether to have animation or not, and decide for each animation parameter whether to bind that parameter to a data field.

In some implementations, the nonstop animation format is applied (622) to a fill property, and animating the visual marks comprises a repeated fill operation. For example, FIG. 5J illustrates that the fill pattern of the bars is animated (e.g., to show rain falling within the bars), with the animation (and/or the size of the fill pattern, or another visual property of the fill pattern) optionally tied to the total amount of weekly precipitation (e.g., a larger data value results in a faster speed of "falling"), as described with reference to FIG. 5C.

In some implementations, the nonstop animation format is applied (624) to composite visual marks. Animating the visual marks comprises animating a respective component of each visual mark. For example, in FIG. 5B, the rotation rate of the windmill is bound to the average weekly wind speed.

In some implementations, the nonstop animation format specifies (626) a speed of animation and an orientation (e.g., fall and/or rotate) for animation.

In response to receiving the second user input, the computer system binds (628) the third data field to the third visual property. The computer system modifies (628) the data visualization to animate the visual marks according to the third visual property and data values for the third data field. For example, as described with reference to FIGS. 4A-4C, the user binds the data field "SUM (Sales)" to animate the y-coordinate visual property. The y-coordinate of each bar moves (e.g., is animated to move) according to the respective data value, for each State, of SUM (Sales).

In some implementations, each visual mark consists of (630) a respective single component, and the first, second, and third visual properties all apply to the respective single component of each visual mark.

In some implementations, each visual mark comprises (632) two or more distinct components, the first visual property applies to a respective first component of each visual mark, and the third visual property applies to a respective second component, distinct from the first component, of each visual mark. This is illustrated in FIGS. 5G-5J. In some implementations, the first component is (634) static and the second component is (634) continuously animated. This is illustrated in FIGS. 5G-5J. In some implementations, the second visual property applies (636) to the first component of each visual mark.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of animating data visualizations, comprising:
at a computer system having one or more processors, a display, and memory storing one or more programs configured for execution by the one or more processors:
displaying a graphical user interface on the display, including (a) a schema region displaying a plurality of data field icons, each data field icon representing a respective data field from a user-selected data source and (b) a canvas region displaying a data visualization having a plurality of visual marks, each visual mark representing data from the data source according to visual properties assigned to user-selected data fields, including assignment of a first data field to a first visual property;
receiving a first user input to associate a second data field icon of the plurality of data field icons, representing a second data field, to a second visual property of the visual marks;
in response to receiving the first user input, binding the second data field to the second visual property, and modifying the data visualization so that the second visual property of each visual mark is displayed in accordance with data values of the second data field;
receiving a second user input to associate a third data field icon, representing a third data field, to a third visual property of the visual marks, the third visual property specifying a nonstop animation format that is applied to a fill property of the visual marks; and
in response to receiving the second user input, automatically aggregating the third data field to generate aggregated data values for the third data field and binding the third data field to the third visual property and modifying the data visualization to animate the visual marks with the nonstop animation format comprising a fill pattern of the visual marks that is specified by the third visual property and wherein a speed of the fill pattern is performed according to the aggregated data values for the third data field.

2. The method of claim 1, further comprising, prior to displaying the data visualization, receiving a user input to (i) select a first data field icon, representing the first data field, from the schema region, and (ii) place the first data field icon onto the canvas region.

3. The method of claim 1, wherein the canvas region includes a plurality of user interface affordances to designate (i) a layout type that specifies a row-based arrangement, a column-based arrangement, or an inline arrangement, (ii) a mark type that specifies a shape for the visual marks, (iii) one or more visual encodings that specify color, size, text, x-axis, y-axis, ascending sort, descending sort, or level of detail for the visual marks, according to data values for a respective data field represented by a respective data field icon, and (iv) other visual properties that define the visual marks.

4. The method of claim 1, wherein the first user input comprises selecting the second data field icon from the schema region and moving the second data field icon to a portion of the canvas region that specifies a plurality of visual properties.

5. The method of claim 1, wherein the first user input comprises a drag and drop operation.

6. The method of claim 1, wherein the visual properties include: shape properties, fill properties, stroke properties, orientation properties, and size properties.

7. The method of claim 1, wherein the nonstop animation format specifies an orientation for animation.

8. The method of claim 1, wherein each visual mark consists of a respective single component, and the first, second, and third visual properties all apply to the respective single component of each visual mark.

9. The method of claim 1, wherein each visual mark comprises two or more distinct components, the first visual property applies to a respective first component of each visual mark, and the third visual property applies to a respective second component, distinct from the first component, of each visual mark.

10. The method of claim 9, wherein the first component is static and the second component is continuously animated.

11. The method of claim 9, wherein the second visual property applies to the first component of each visual mark.

12. A computing device, comprising:
one or more processors;
memory;
a display; and
one or more programs stored in the memory and configured for execution by the one or more processors, the one or more programs comprising instructions for:

displaying a graphical user interface on the display, including (a) a schema region displaying a plurality of data field icons, each data field icon representing a respective data field from a user-selected data source and (b) a canvas region displaying a data visualization having a plurality of visual marks, each visual mark representing data from the data source according to visual properties assigned to user-selected data fields, including assignment of a first data field to a first visual property;

receiving a first user input to associate a second data field icon of the plurality of data field icons, representing a second data field, to a second visual property of the visual marks;

in response to receiving the first user input, binding the second data field to the second visual property, and modifying the data visualization so that the second visual property of each visual mark is displayed in accordance with data values of the second data field;

receiving a second user input to associate a third data field icon, representing a third data field, to a third visual property of the visual marks, the third visual property specifying a nonstop animation format that is applied to a fill property of the visual marks; and in response to receiving the second user input, automatically aggregating the third data field to generate aggregated data values for the third data field and binding the third data field to the third visual property and modifying the data visualization to animate the visual marks with the nonstop animation format comprising a fill pattern of the visual marks that is specified by the third visual property and wherein a speed of the fill pattern is performed according to the aggregated data values for the third data field.

13. The computing device of claim 12, wherein the canvas region includes a plurality of user interface affordances to designate (i) a layout type that specifies a row-based arrangement, a column-based arrangement, or an inline arrangement, (ii) a mark type that specifies a shape for the visual marks, (iii) one or more visual encodings that specify color, size, text, x-axis, y-axis, ascending sort, descending sort, fill properties, stroke properties, or level of detail for the visual marks, according to data values for a respective data field represented by a respective data field icon, and (iv) other visual properties that define the visual marks.

14. The computing device of claim 12, wherein the nonstop animation format specifies an orientation for animation.

15. The computing device of claim 12, wherein each visual mark consists of a respective single component, and the first, second, and third visual properties all apply to the respective single component of each visual mark.

16. The computing device of claim 12, wherein each visual mark comprises two or more distinct components, the first visual property applies to a respective first component of each visual mark, and the third visual property applies to a respective second component, distinct from the first component, of each visual mark.

17. The computing device of claim 16, wherein the first component is static and the second component is continuously animated.

18. A non-transitory computer readable storage medium storing one or more programs configured for execution by a computing device having one or more processors, memory, and a display, the one or more programs comprising instructions for:

displaying a graphical user interface on the display, including (a) a schema region displaying a plurality of data field icons, each data field icon representing a respective data field from a user-selected data source and (b) a canvas region displaying a data visualization having a plurality of visual marks, each visual mark representing data from the data source according to visual properties assigned to user-selected data fields, including assignment of a first data field to a first visual property;

receiving a first user input to associate a second data field icon of the plurality of data field icons, representing a second data field, to a second visual property of the visual marks;

in response to receiving the first user input, binding the second data field to the second visual property, and modifying the data visualization so that the second visual property of each visual mark is displayed in accordance with data values of the second data field;

receiving a second user input to associate a third data field icon, representing a third data field, to a third visual property of the visual marks, the third visual property specifies a nonstop animation format that is applied to a fill property of the visual marks; and in response to receiving the second user input, automatically aggregating the third data field to generate aggregated data values for the third data field and binding the third data field to the third visual property and modifying the data visualization to animate the visual marks with the nonstop animation format comprising a fill pattern of the visual marks that is specified by the third visual property and wherein a speed of the fill pattern is performed according to the aggregated data values for the third data field.

* * * * *